United States Patent
Yamaguchi et al.

(10) Patent No.: US 6,240,253 B1
(45) Date of Patent: May 29, 2001

(54) AUTOMATIC FOCUSING CAMERA

(75) Inventors: Motoshi Yamaguchi, Sakai; Ichiro Tsujimura, Higashiosaka; Shigeto Ohmori, Kawachinagano; Tsutomu Ichikawa, Sakai; Hiroshi Ueda, Habikino; Tatsuya Suzuki, Kawachinagano; Akio Nakamaru, Sakai, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/396,351

(22) Filed: Sep. 14, 1999

(30) Foreign Application Priority Data

Sep. 14, 1998 (JP) .................................. 10-259772
Sep. 14, 1998 (JP) .................................. 10-259808

(51) Int. Cl.$^7$ ........................................... G03B 15/05
(52) U.S. Cl. ........................... 396/61; 396/123; 396/130; 396/159
(58) Field of Search ..................... 396/61, 121, 122, 396/123, 130, 159, 65, 67, 68

(56) References Cited

U.S. PATENT DOCUMENTS

| 3,836,920 | * | 9/1974 | Uchiyama et al. | 396/65 |
| 4,188,104 | * | 2/1980 | Uchiyama et al. | 396/67 |
| 5,212,513 |   | 5/1993 | Ishida et al. | 396/121 |
| 5,815,743 |   | 9/1998 | Ohmori | 396/61 |
| 6,035,139 | * | 3/2000 | Nakamura | 396/159 |

* cited by examiner

Primary Examiner—W. B. Perkey
(74) Attorney, Agent, or Firm—Burns, Doane, Swecker & Mathis, LLP

(57) ABSTRACT

An automatic-focusing camera is provided with a multiple-point distance-measurement device having a plurality of distance-measurement areas, a multiple-division photometry device having a plurality of photometry areas, and a multiple-division light-amount-control device having a plurality of light-amount-control areas. Part of the photometry areas and part of the light-amount-control areas correspond to the distance-measurement areas. When a taking lens is focused on a subject, its focus is locked. Out of the information obtained from the multiple-point distance-measurement device, a set of information obtained when the focus of the taking lens is locked is compared with a set of information obtained immediately before a shot is taken, and thereby a change in picture composition after the locking of the taking lens focus is detected. This makes it possible to achieve exposure control in ambient-light shooting and light amount control in flash shooting in accordance with a change in picture composition. Based on the information obtained from the multiple-point distance-measurement device, the subject and the background are identified, and, in accordance with the distribution of the subject and the background, the reference value to be used to stop emission of illumination light and the contribution ratios of the individual light-amount-control areas relative to the total amount of light received are determined to achieve light amount control in flash shooting.

20 Claims, 26 Drawing Sheets

SUBJECT POSITION IMMEDIATELY BEFORE SHOOTING

SUBJECT POSITION WHEN FOCUS WAS LOCKED

AUTOMATIC FOCUSING CAMERA

This application is based on applications Nos. H10-259772 and H10-259808 filed in Japan on Sep. 14, 1998, the entire content of which is hereby incorporated by reference.

BACKGROUND OF THE INVENTION

1. Field of the Invention

The present invention relates to an automatic focusing camera having a focus locking function for locking the focus when its taking lens focuses on a subject and having a plurality of distance-measurement areas from which to obtain information to be used for focus adjustment of the taking lens. The present invention relates also to a camera that performs light amount control in such a way that emission of light for illuminating the subject is stopped when the amount of light reflected from the subject reaches a predetermined level.

2. Description of the Prior Art

An automatic focusing camera is provided with a focus locking function for locking the focus of its taking lens when the taking lens focuses on a subject. This permits the user to change the composition of the picture to be shot freely after having focused the taking lens on the subject. On the other hand, in flash shooting, an automatic focusing camera performs light amount control by emitting illumination light while detecting the light reflected from the subject so that emission of the illumination light will be stopped when the detected amount of received light reaches a predetermined reference level.

In recent years, automatic focusing cameras have been proposed that are provided with a plurality of distance-measurement areas used to obtain information necessary for focus adjustment of the taking lens and a plurality of light-amount-control areas used to detect the amount of flash illumination light necessary for light amount control in flash shooting, with these distance-measurement and light-amount-control areas arranged so as to show correspondence between them. FIGS. 28 and 29 schematically show configurations for achieving light amount control in such automatic focusing cameras.

These cameras have a multiple-point distance-measurement means having a plurality of distance-measurement areas and a multiple-area light-amount-control means having a plurality of light-amount-control areas including those which correspond to the distance-measurement areas. In the individual distance-measurement areas of the multiple-point distance-measurement means, acquisition and output of distance-measurement information are performed constantly to make such information available for detection of the focus condition of the taking lens with respect to the subject and for focus adjustment. When the distance-measurement information from any of the distance-measurement areas leads to a determination that the taking lens is focused on the subject, focus adjustment of the taking lens is stopped and thereby the focus is locked.

In flash shooting, the multiple-area light-amount-control means detects the reflection of emitted illumination light so that emission of the illumination light will be stopped when the sum of the amount of light received in the individual light-amount-control areas reaches a reference level. The contribution ratios of the individual light-amount-control areas used in calculating the sum of the amount of received light and the reference level are variable according to the position of the subject. The multiple-area light-amount-control means evaluates the position of the subject within the shooting range on the basis of the distance-measurement information of the individual distance-measurement areas output from the multiple-point distance-measurement means, and, in accordance therewith, determines the contribution ratios and the reference level. In this way, the subject is illuminated to appropriate brightness.

The camera shown in FIG. 28 has an on-focusing information output means by which the distance-measurement information output from the multiple-point distance-measurement means when the focus is locked is fed to the multiple-area light-amount-control means. By contrast, the camera shown in FIG. 29 has an on-shooting information output means by which the distance-measurement information output from the multiple-point distance-measurement means immediately before shooting is fed to the multiple-area light-amount-control means. Accordingly, the contribution ratios of the individual light-amount-control areas and the reference level are determined, in the camera shown in FIG. 28, when the focus is locked and, in the camera shown in FIG. 29, immediately before shooting.

There have also been proposed automatic focusing cameras that are provided with a plurality of photometry areas used to detect brightness necessary for exposure control, with some of those photometry areas corresponding to a plurality of distance-measurement areas. FIGS. 30 and 31 schematically show configurations for achieving exposure control in such automatic focusing cameras. These cameras have a multiple-point distance-measurement means having a plurality of distance-measurement areas, a multiple-area photometry means having a plurality of photometry areas including those which correspond to the distance-measurement areas, and an exposure-control means for controlling exposure by adjusting the shutter speed and the diaphragm.

The exposure-control means, giving weights to the amount of light detected in the individual photometry areas of the multiple-area photometry means, calculates a weighted mean thereof, and performs exposure control on the basis of the resulting value. The weights given to the individual photometry areas are variable according to the position of the subject within the shooting range. The exposure-control means evaluates the position of the subject on the basis of the distance-measurement information of the individual distance-measurement areas output from the multiple-point distance-measurement means, and, in accordance therewith, determines the weights. In this way, exposure is controlled, with the brightness of the background taken into consideration, so that the subject will be shot with appropriate brightness.

The camera shown in FIG. 31 has an on-focusing information output means by which the distance-measurement information output from the multiple-point distance-measurement means when the focus is locked is fed to the exposure-control means. Accordingly, the weights given to the individual photometry areas are determined when the focus is locked.

With any of these cameras, when the user changes the direction of the camera after the focus has been locked, or when the subject moves after the focus has been locked, the picture composition changes. However, with the camera shown in FIG. 28, where the contribution ratios of the light-amount-control areas and the reference level are determined when the focus is locked, changing the picture composition after locking the focus makes the already-determined contribution ratios and reference level inconsistent with the picture composition with which shooting is actually performed. Thus, it is impossible to achieve appropriate light amount control.

This problem does not occur with the camera shown in FIG. 29, where the contribution ratios of the light-amount-control areas and the reference level are determined immediately before shooting. However, there is no guarantee that the subject will invariably be caught in any of the distance-measurement areas immediately before shooting, and, even if the subject is caught in any of the distance-measurement areas, there is a possibility that low contrast will hamper acquisition of distance-measurement information sufficient to identify the subject. In such a case, it is impossible to determine the contribution ratios and the reference level in accordance with the position of the subject, and thus it is difficult to achieve appropriate light amount control.

There has also been proposed a method of preliminarily emitting illumination light immediately before shooting so that, on the basis of the reflection thereof, the reference value to be used to stop emission of the illumination light will be determined. However, this requires provision of an extra mechanism for controlling preliminary emission of illumination light, and thus requires a complicate camera design at extra cost.

With the camera shown in FIG. 31, the weights given to the individual photometry areas are determined when the focus is locked. Therefore, if the picture composition changes after the focus has been locked, the already-determined weights become inconsistent with the composition with which shooting is actually performed, and thus it is not always possible to achieve appropriate exposure control. In particular, under such shooting conditions as when watching a sport game or a theatrical performance, where the position of the subject tends to change greatly in a short period of time, the condition of the light rays reaching the camera varies accordingly greatly, and thus there is a strong possibility that appropriate exposure control will be impossible. Under such shooting conditions, it is preferable to vary the exposure according as the picture composition changes.

With the camera shown in FIG. 30, exposure is controlled on the basis of the latest distance-measurement information acquired immediately before shooting, and therefore, as with the camera shown in FIG. 29, when the picture composition changes, there is a possibility that acquisition of distance-measurement information sufficient to identify the subject will be impossible. In such a case, it is impossible to determine the weights in accordance with the position of the subject, and thus it is difficult to achieve appropriate exposure control.

As described previously, in flash shooting, the contribution ratios of the individual light-amount-control areas are determined in accordance with the position of the subject within the shooting range so that the subject will be illuminated to appropriate brightness. However, even in cases where light amount control is performed in that way, the contribution ratios of the individual light-amount-control areas are determined simply on the basis of the positional relationship between the respective light-amount-control areas and the light-amount-control area in which the subject is being caught; that is, they are determined with no consideration given to the actual distance between the subject and the background.

The light-amount-control areas in which the subject is not being caught receive light from the background. If there is no great difference between the distance from the camera to the subject and the distance to the background, illumination light is reflected from the background so as to be incident on the light-amount-control areas. By contrast, if there is a great difference between the distance to the subject and the distance to the background, illumination light does not reach the background, and thus no part thereof is reflected from the background so as to be incident on the light-amount-control areas. In this way, in the light-amount-control areas that correspond to the background, different amounts of light is detected in accordance with the distance between the subject and the background.

Thus, according to the conventional light-amount-control method, the contribution ratios of the individual light-amount-control areas are determined with no consideration given to the actual distance between the subject and the background. This occasionally causes inappropriate determination of the contribution ratios for the background, making it impossible to shoot the subject with desired brightness.

SUMMARY OF THE INVENTION

An object of the present invention is to provide a camera that can perform shooting with appropriate brightness even if the picture composition changes after the focus has been locked, and a camera that can control exposure accurately in flash shooting.

To achieve the above object, according to one aspect of the present invention, a camera is provided with: a taking lens; a distance-measurement device for obtaining information with which to perform focus adjustment and focus condition checking of the taking lens; a light-sensing device for detecting the amount of light coming from a subject; a first calculator for obtaining information related to the distance to the subject on the basis of the information fed from the distance-measurement device at the moment when the taking lens is focused; a second calculator for obtaining information related to the distance to the subject on the basis of the information fed from the distance-measurement device after the moment when the taking lens is focused; a detector for detecting a change in picture composition on the basis of the information obtained by the first calculator and the information obtained by the second calculator; and a controller for controlling exposure on the basis of the amount of light coming from the subject as detected by the light-sensing device and the change in picture composition as detected by the detector.

This camera can control exposure on the basis of a change in picture composition both in shooting under ambient light and in shooting accompanied by emission of light for illuminating the subject.

According to another aspect of the present invention, a camera is provided with: a distance measurement sensor for obtaining information related to the distance to a shooting target; a light sensor for detecting the amount of illumination light reflected from the shooting target; a detector for detecting distribution of the main subject and the background included in the shooting target on the basis of the information obtained by the distance measurement sensor; and a controller for setting a predetermined value on the basis of the distribution of the main subject and the background as detected by the detector and for stopping emission of the illumination light when the amount of light detected by the light sensor reaches the predetermined value.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Hereinafter, an automatic-focusing camera embodying the present invention will be described with reference to the accompanying drawings. The automatic-focusing camera 1 (hereafter also referred to simply as the "camera") of this embodiment is built as a single-lens reflex camera that allows various interchangeable lenses to be mounted thereon, and achieves automatic focusing (AF) of its taking lens by a method based on phase difference detection. FIGS. 1 to 4 show examples of the control system of this camera 1.

The camera 1 is composed of a camera body 10 and a taking lens 30. In the configurations shown in FIGS. 1 and 2, a flash unit 40 for emitting light for illuminating the subject can be mounted on the upper part of the camera body 10; in the configurations shown in FIGS. 3 and 4, a flash unit is built into the camera body 10.

Figure 1:
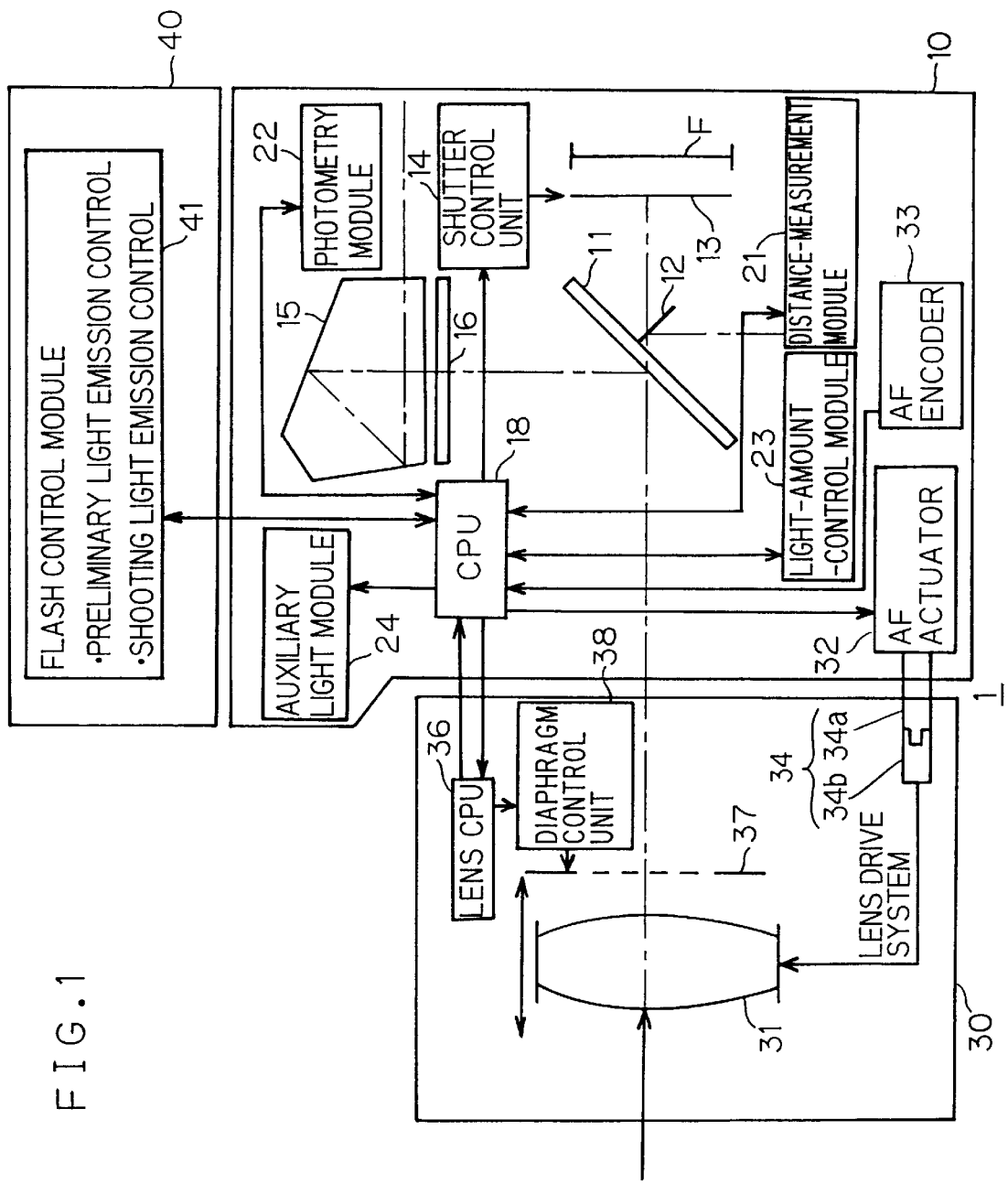
FIG. 1 is a diagram showing an example of the configuration of the control system of a camera embodying the invention.
Figure 2:
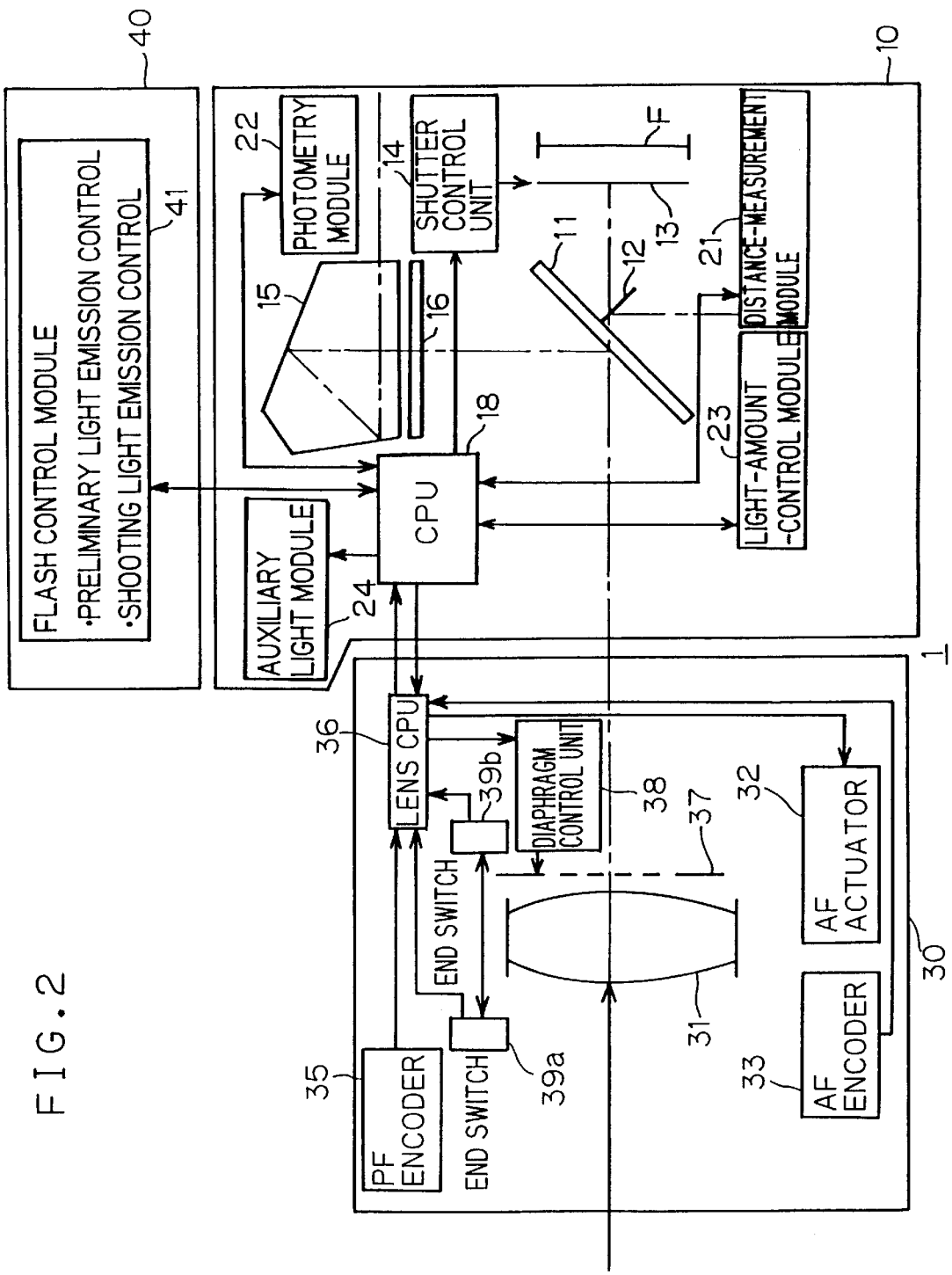
FIG. 2 is a diagram showing another example of the configuration of the control system of the camera.
Figure 3:
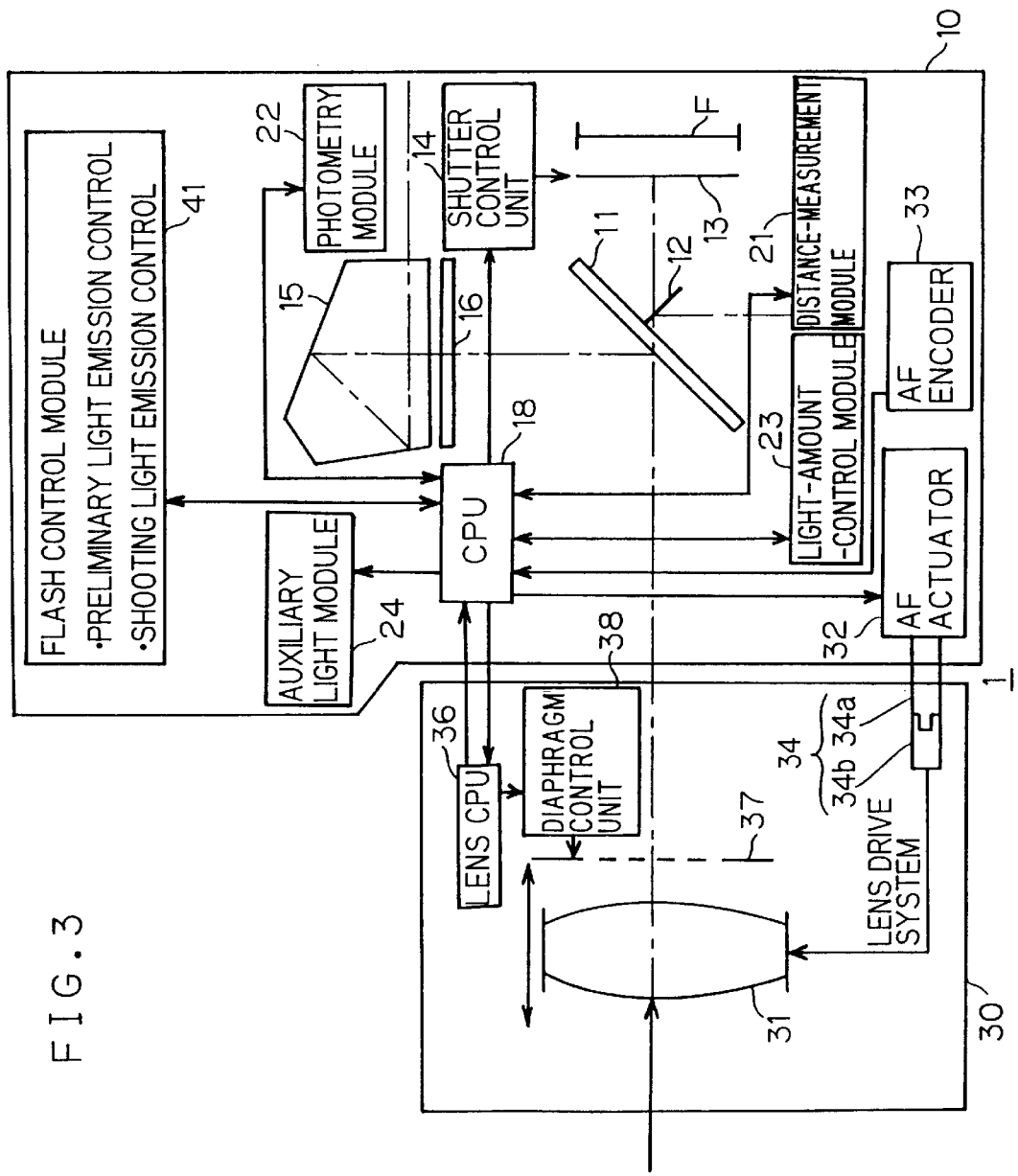
FIG. 3 is a diagram showing another example of the configuration of the control system of the camera.
Figure 4:
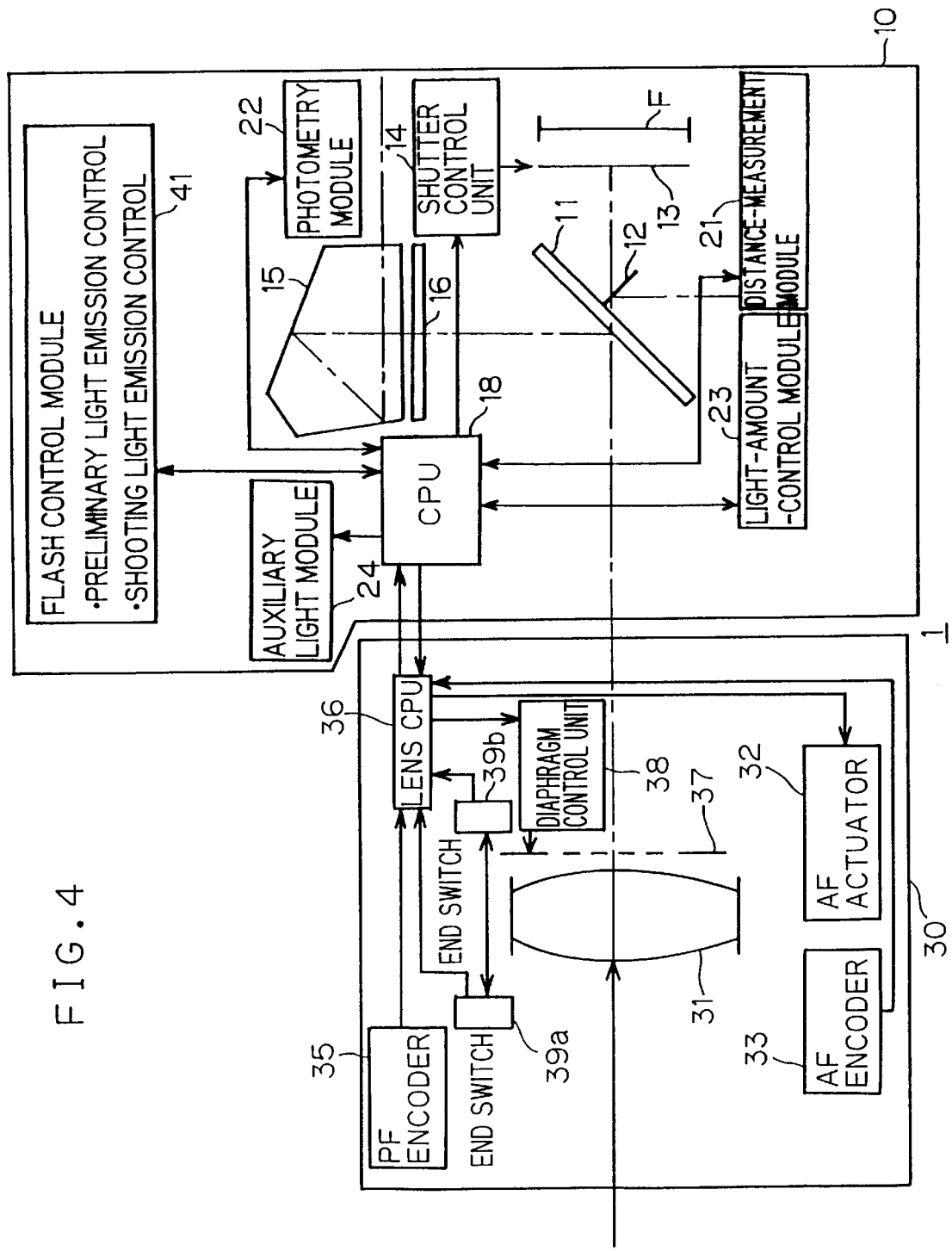
FIG. 4 is a diagram showing another example of the configuration of the control system of the camera.

In the configurations shown in FIGS. 1 and 3, an AF actuator 32 for driving a focusing lens 31 for focus adjustment of the taking lens 30 and an AF encoder 33 for detecting the driving amount of the AF actuator 32 are built into the camera body 10; in the configurations shown in FIGS. 2 and 4, the AF actuator 32 and the AF encoder 33 are built into the taking lens 30. In the configurations in which the AF actuator 32 is built into the camera body 10, coupler pieces 34a and 34b, which together constitute a coupler 34, are provided on the camera body 10 and on the taking lens 30, respectively, so that the driving force of the AF actuator 32 is transmitted through the coupler 34 to the focusing lens 31.

In the configurations in which the AF actuator 32 is built into the taking lens 30, manual focusing (MF) is possible that allows the user to adjust the focus of the taking lens 30 manually. Here, as a method of manual focusing, power focusing (PF) is adopted in which the AF actuator 32 is driven in accordance with the operation by the user so as to move the focusing lens 31. To achieve this, an operation ring (not shown) is provided around the outer surface of the taking lens 30, and a PF encoder 35 is provided to detect the rotation of the operation ring.

The camera body 10 is provided with a main mirror 11 of a swing-up type, a sub-mirror 12 fitted on the main mirror 11, a shutter arranged immediately in front of a silver-halide film F placed behind the main mirror 11, a shutter control unit 14 for controlling the opening/closing of the shutter 13, a pentagonal prism 15 for directing the light reflected upward by the main mirror 11 to the user's eye, a focusing screen 16 arranged between the main mirror 11 and the pentagonal prism 15, and a CPU 18 for controlling the operation of the entire camera 1. A central portion of the main mirror 11 is made semitransparent, and the light that has passed through that portion is reflected downward by the sub-mirror 12.

The camera body 10 is further provided with a distance-measurement module 21 for obtaining information related to the distance to the subject by sensing the light reflected from the sub-mirror 12, a photometry module 22 for detecting the amount of light reflected from the main mirror 11, a light-amount-control module 23 for detecting the amount of light reflected from the film F in flash shooting, and an auxiliary light module 24 for emitting AF auxiliary light. The outputs of the distance-measurement module 21, the photometry module 22, and the light-amount-control module 23 are fed to the CPU 18 so as to be used for focus adjustment of the taking lens 30, exposure control, and light amount control in flash shooting, respectively.

The taking lens 30 is provided with, in addition to the focusing lens 31, a diaphragm 37 for restricting the amount of light, a diaphragm control unit 38 for opening/closing an aperture of the diaphragm 37, and a lens CPU 36 for controlling the entire lens 30. The lens CPU 36 communicates with the CPU 18 of the camera body 10 to exchange information necessary for appropriate control. In the configurations shown in FIGS. 2 and 4 in which the AF actuator 32 for driving the focusing lens 31 is provided in the taking lens 30, end switches 39a and 39b are provided to detect that the focusing lens 31 is positioned at the closest-distance-side end or at the infinite-distance-side end, respectively.

The absolute position of the focusing lens is known by the driving amount by which it is driven (i.e. the distance through which it is driven) from the end of its movement stroke that is used as a reference position. The taking lens 30 may be provided with a mechanism that directly detects the absolute position of the focusing lens 31. In that case, it is possible to know the absolute position of the focusing lens even when, in the configurations shown in FIGS. 1 and 3, the coupler 34 is disengaged.

The flash unit 40 is provided with a device (not shown) for emitting illumination light to the subject, such as composed of a xenon lamp, a capacitor, a reflecting mirror, and other components, and is also provided with a flash control module 41. The direction in which the flash unit 40 emits light is variable, so that bounce illumination is possible by emitting light to an object in the surroundings, such as a ceiling, and illuminating the subject by the light reflected therefrom. Flash bracket shooting is also possible in which a plurality of frames are sequentially shot while the amount of emitted light is varied stepwise. Moreover, it is also possible to attach a diffuser on the front surface of the flash unit 40 to diffuse the light emitted. The direction of light emission and the presence of a diffuser are detected by the flash control module 41 and communicated to the CPU 18.

Light emission does not necessarily have to be effected as flash light emission as is commonly used, but may be effected as flat light emission or FP (flat pulse) light emission.

The distance-measurement module 21 is provided with a multiple-point distance-measurement device having a plurality of distance-measurement areas, and, in each of those distance-measurement areas, a pair of line or area sensors and an optical system for directing different portions of a light beam to those two sensors are provided. All of such sensors output signals that represent the amount of light received at individual pixels, and the distance-measurement module 21 outputs those signals, as distance-measurement data, to the CPU 18. The distance-measurement module 21 outputs distance-measurement data repeatedly with a short cycle that is substantially constant.

On the basis of the distance-measurement data fed from the distance-measurement module 21, the CPU 18 generates, for each of the distance-measurement areas, distance-measurement information to be used for focus adjustment and focus condition checking of the taking lens 30. Specifically, for each of the sensors, the differences in the amount of received light between adjacent pixels are calculated to generate data representing the contrast of the image formed on the sensor, and, for each of the distance-measurement areas, the contrast is compared between the two sensors to detect the correspondence of the images formed on the two sensors. Then, on the basis of the distance between the corresponding parts of the two images, the location at which the light from the shooting area corresponding to that distance-measurement area forms an image after passing through the taking lens 30 is calculated. Then, the distance from the calculated image-formation location to the film F is determined as the defocus amount DF. However, when the contrast on the sensors is too low, it is impossible to check the correspondence of the images between the sensors, and thus it is impossible to determine the defocus amount.

On the basis of the degree of contrast, the degree (amount) of defocus, and the direction of defocus, i.e. whether the light having passed through the taking lens 30 forms an image in front of or behind the film F, the CPU 18 recognizes which one among the distance-measurement areas that permit determination of the defocus amount includes the image of the subject, i.e. the main object included in the shooting target. Then, on the basis of the defocus amount in the distance-measurement area that includes the image of the subject, the CPU 18 performs focus adjustment and focus condition checking of the taking lens 30. When the defocus amount becomes lower than a predetermined reference value, the CPU 18 recognizes the taking lens 30 as focused on the subject, and thus stops focus adjustment to lock the focus.

When the absolute position of the focusing lens 31 of the taking lens 30 is known, it is possible to know the distance on which the taking lens 30 is focused. In that case, on the basis of the distance on which the taking lens 31 is focused and the distance between the corresponding parts of the images formed on the sensors in the individual distance-measurement areas, it is possible to determine the distance DV to the object present within the shooting range of each distance-measurement area. This distance DV (hereafter referred to as the detected distance) is used as distance-measurement information for focus adjustment and focus condition checking of the taking lens 30.

The photometry module 22 is provided with a multiple-division photometry device having a plurality of photometry areas. The photometry module 22 senses ambient light in the individual photometry areas, and outputs the amounts of light received in the individual photometry areas to the CPU 18. The CPU 18 gives weights to the amounts of light received in the individual photometry areas and calculates the sum thereof. Then, on the basis of this sum and the sensitivity of the film F, the CPU 18 calculates an appropriate exposure value, and sets the period of time for which the shutter 13 will be kept open, i.e. the shutter speed, and the diameter of the aperture of the diaphragm 37, i.e. the aperture value.

In the camera 1, it is possible to select one of the following four exposure control modes: a program mode in which the shutter speed and the aperture value are set in accordance with a predetermined relationship, a shutter priority mode in which the aperture value is set in accordance with the shutter speed specified by the user, an aperture priority mode in which the shutter speed is set in accordance with the aperture value specified by the user, and a manual mode in which the shutter speed and the aperture value specified by the user are adopted. In the manual mode, the shutter speed and the aperture value are not set in accordance with the exposure value calculated by the CPU 18, but instead whether the shutter speed and the aperture value specified by the user are appropriate or not is checked on the basis of the calculated exposure value, and the check result is displayed.

The weights given to the individual photometry areas are variable, and are set by the CPU 18 in accordance with the position of the subject. Thus, it is possible to set an exposure value that promises appropriate exposure of the subject, taking the brightness of the background into consideration. Moreover, by appropriately varying the weights given to the individual photometry areas, it is possible to achieve exposure control by various photometry methods such as spot metering, center-weighted metering, and averaging metering.

Figure 5:
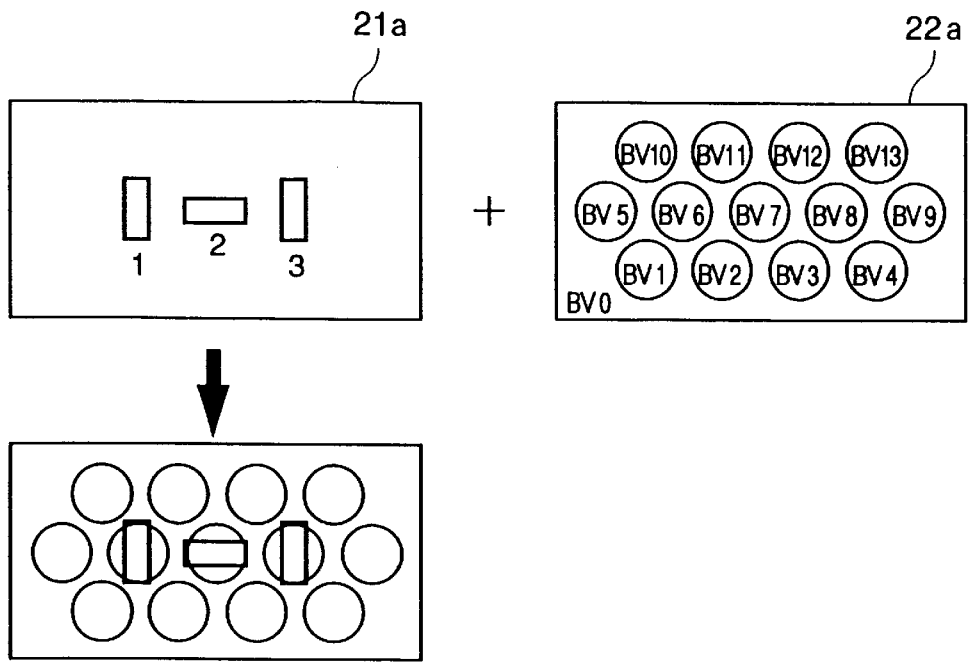
FIG. 5 is a diagram showing the relationship between the multiple-point distance-measurement device and the multiple-division photometry device.

In the camera 1 of the embodiment, the multiple-point distance-measurement device has three distance-measurement areas, and the multiple-division photometry device has fourteen photometry areas. The relationship between the multiple-point distance-measurement device 21a and the multiple-division photometry device 22a is shown in FIG. 5. Here, the three distance-measurement areas of the multiple-point distance-measurement device 21a are called areas 1 to 3, with area 2 located at the center of a frame on the film F and areas 1 and 3 located on the left and right, respectively, of area 2. In area 2, a pair of sensors are arranged horizontally, and in each of areas 1 and 3, a pair of sensors are arranged vertically.

The 14 photometry areas of the multiple-division photometry device 22a are called areas BV0 to BV13. Areas BV1 to BV13 are of an identical size, and are arranged in three horizontal rows, with areas BV1 to BV4 arranged in the lower row, areas BV5 to BV9 arranged in the central row, and areas BV10 to BV13 arranged in the upper low. Areas BV1 to BV13 are arranged at regular intervals in such a way that three areas BV6 to BV8 in the central row are each enclosed by six other areas. Area BV0 covers the entire area of the frame excluding the portions thereof covered by areas BV1 to BV13.

Areas BV6, BV7, and BV8 are located in positions that correspond to areas 1, 2, and 3, respectively, of the multiple-point distance-measurement device 21a. Accordingly, if the subject is caught in area 1, the light from the subject is sensed in area BV6.

The light-amount-control module 23 is provided with a multiple-division light-amount-control device having a plurality of light-amount-control areas. In flash shooting, the light-amount-control module 23 senses, in the individual light-amount-control areas, the illumination light reflected from the subject and the background, and outputs the amounts of light received in the individual light-amount-control areas to the CPU 18. When the sum of the amounts of light received in the individual light-amount-control areas reaches a predetermined reference value, the CPU 18 recognizes that an appropriate amount of light has been emitted to the subject, and, through the flash control module 41, stops light emission.

The reference value used to stop light emission is variable, and is set by the CPU 18 in accordance with the distribution of the amounts of light received in the individual light-amount-control areas and the position of the subject. The contribution ratios of the individual light-amount-control areas used to calculate the sum of the amounts of light received is also variable, and is set by the CPU 18 in accordance with the position of the subject. Thus, it is possible to illuminate the subject to appropriate brightness, taking the brightness of the background into consideration.

Figure 6:
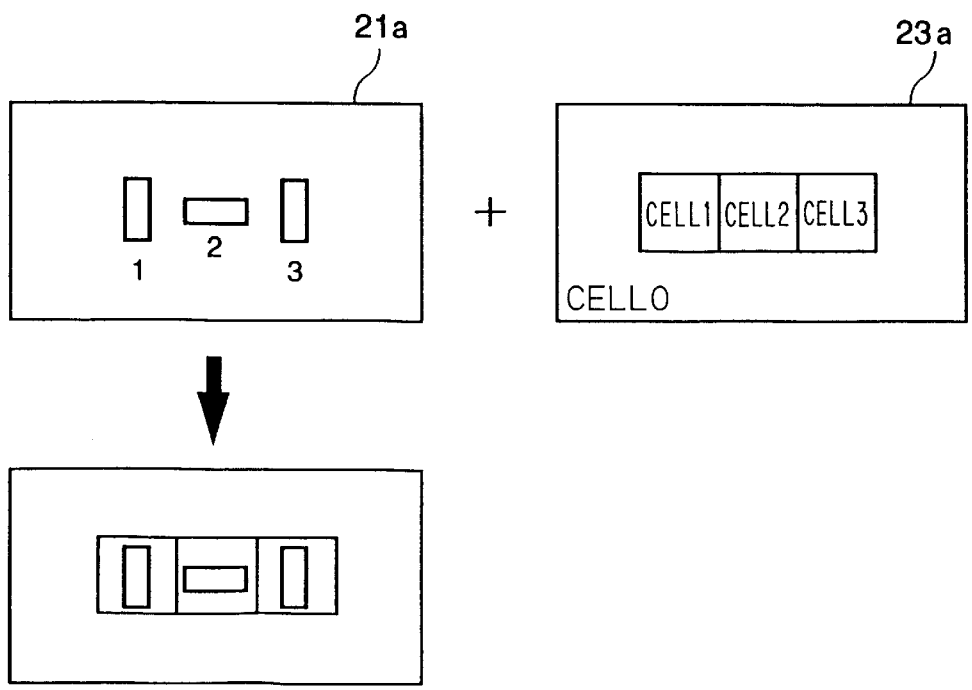
FIG. 6 is a diagram showing the relationship between the multiple-point distance-measurement device and the multiple-division light-amount-control device.

In the camera 1 of the embodiment, the multiple-division light-amount-control device has four light-amount-control areas. The relationship between the multiple-point distance-measurement device 21a and the multiple-division light-amount-control device 23a is shown in FIG. 6. The four light-amount-control areas of the multiple-division light-amount-control device 23a are called cells 0 to 3. Cells 1 to 3 are of an identical size, with cell 2 arranged at the center and cells 1 and 3 arranged on the left and right, respectively, of cell 2. Cell 0 covers the entire area of the frame excluding the portions thereof covered by cells 1 to 3.

Cells 1, 2, and 3 are located in positions that correspond to areas 1, 2, and 3, respectively, of the multiple-point distance-measurement device 21a. Accordingly, if the subject is caught in area 1, the illumination light reflected from the subject is sensed in cell 1.

Figure 7:
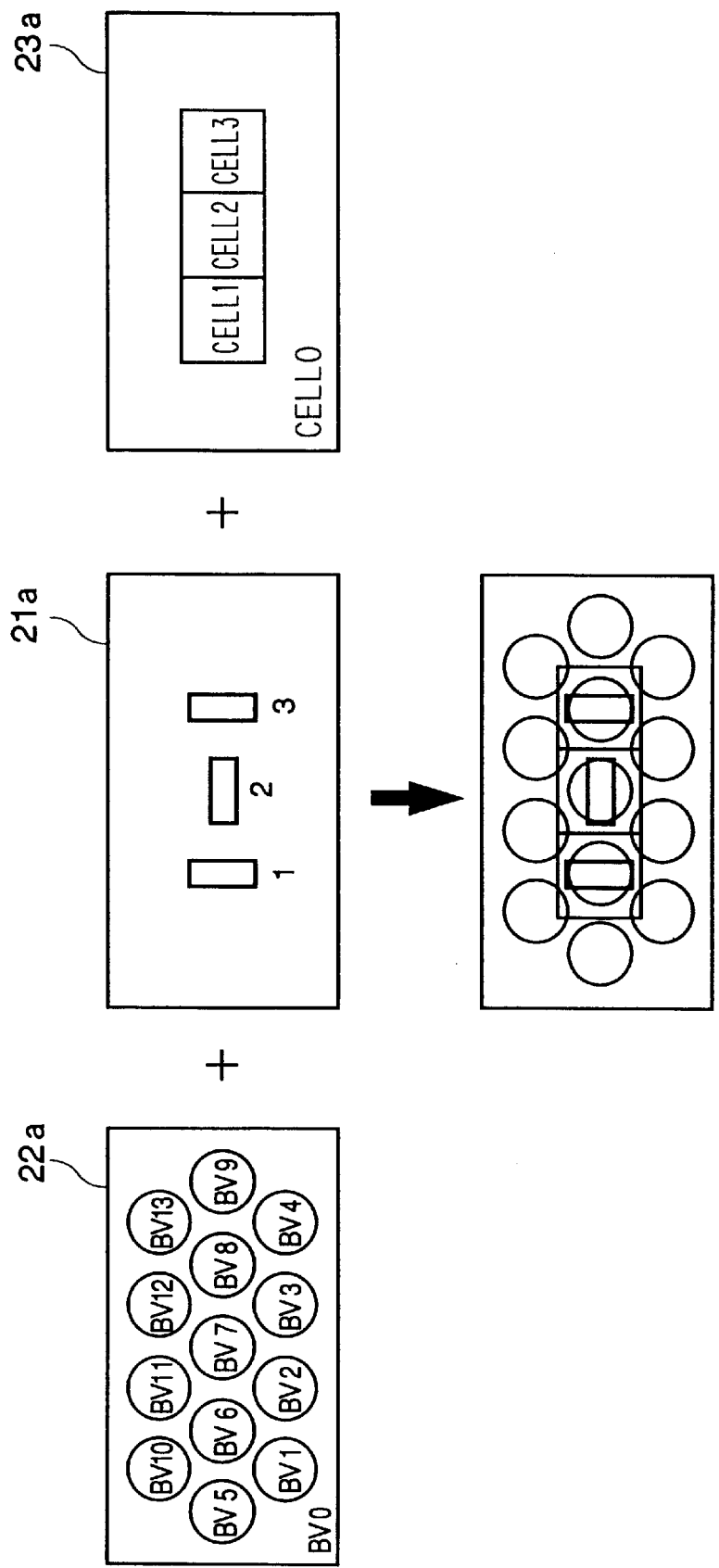
FIG. 7 is a diagram showing the relationship between the multiple-point distance-measurement device, the multiple-division photometry device, and the multiple-division light-amount-control device.

The positional relationship among the multiple-point distance-measurement device 21a, the multiple-division photometry device 22a, and the multiple-division light-amount-control device 23a is shown in FIG. 7. The three distance-measurement areas are located within three photometry areas and simultaneously within three light-amount-control areas, and thus the position of the subject detected by the multiple-point photometry device 21a can be used directly for exposure control and light amount control. That is, by giving a heavier weight to the photometry area that corresponds to the distance-measurement area used for focus condition checking, the CPU 18 can perform exposure control with priority given to the brightness of the subject; similarly, by giving a greater contribution ratio to the light-amount-control area that corresponds to the distance-measurement area used for focus condition checking, the CPU 18 can perform light amount control with priority given to illumination of the subject.

It is to be understood that the distance-measurement areas of the multiple-point distance-measurement device 21a, the photometry areas of the multiple-division photometry device 22a, and the light-amount-control areas of the multiple-division light-amount-control device 23a may be provided in any number and in any arrangement other than specifically given in the above description.

The camera 1 operates in either of the following two shooting modes: an AF priority mode in which a shot is taken only after the taking lens 30 is focused on the subject after receipt of an instruction requesting starting of shooting, and a release priority mode in which a shot is taken immediately in response to an instruction requesting starting of shooting irrespective of whether the taking lens 30 has already been focused on the subject or not. In either shooting mode, distance-measurement information is used not only for focus adjustment of the taking lens 30 but also for exposure control and for light amount control in flash shooting.

Figure 8:
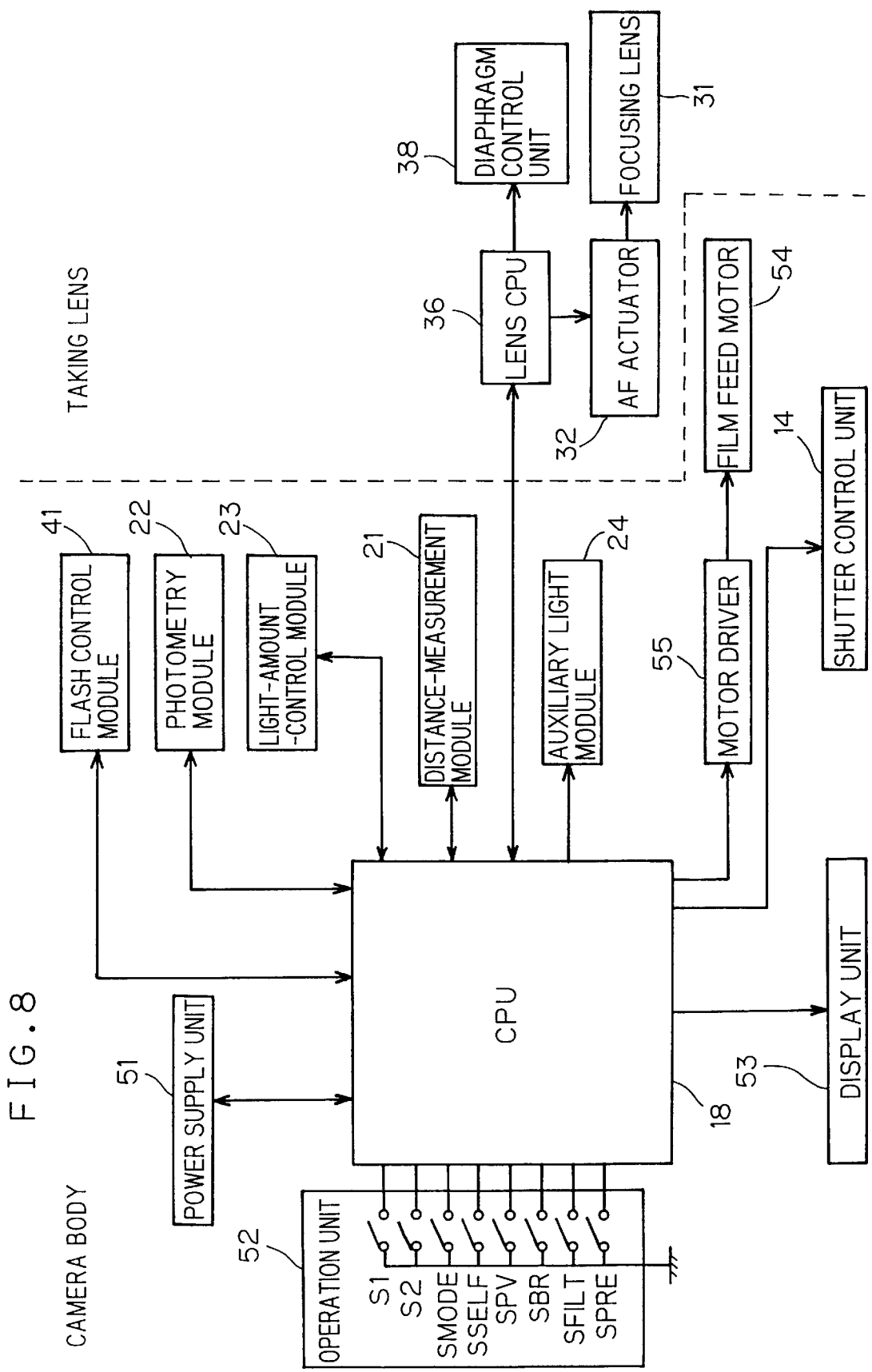
FIG. 8 is a block diagram showing the outline of the configuration of the circuit for operation control.

FIG. 8 shows the outline of the configuration of the circuit for controlling the operation of the camera 1. The camera 1 is provided with, in addition to the already-mentioned circuits such as the distance-measurement module 21 and the light-amount-control module 23, a power supply unit 51 for supplying electric power to whichever portion of the camera 1 requires electric power, an operation unit 52 to be operated by the user, a display unit 53 for displaying various items of information such as the current settings of the camera 1, a motor 54 for feeding the film F, and a driver 55 for driving the motor 54. The CPU 18 controls the supply of electric power from the power supply unit 51, and stops the supply of electric power when a predetermined period of time elapses without any operation performed in the operation unit 52.

The CPU 18 makes the distance-measurement module 21 perform distance measurement repeatedly to obtain distance-measurement information for all of the distance-measurement areas every time the distance-measurement module 21 performs distance measurement, and performs focus adjustment of the taking lens 30 in accordance with the thus obtained distance-measurement information. The circuit configuration shown in FIG. 8 corresponds to the configurations shown in FIGS. 2 and 4 in which the AF actuator 32 is provided in the taking lens 30. Here, focus adjustment of the taking lens 30 is performed through the lens CPU 36. In the configurations in which the AF actuator 32 is provided in the camera body 10, the CPU 18 directly controls the AF actuator 32.

The lens CPU 36 feeds information related to the taking lens 30, such as the focal length of the taking lens 30 and the open aperture value of the diaphragm 37, to the CPU 18, and the CPU 18 uses this information to control the camera 1. Moreover, in response to an instruction from the CPU 18, the lens CPU 36 controls the opening/closing of the diaphragm 37 through the diaphragm control unit 38.

The CPU 18 receives, from the flash control module 41, information related to the settings of the flash unit 40, such as the direction of light emission for bounce illumination and the presence of a diffuser, and in return feeds the flash control module 41 with instructions related to emission of illumination light and preparations therefor, such as charging of the capacitor, starting of light emission, and stopping of light emission.

The CPU 18 feeds the photometry module 22 with instructions requesting starting and stopping of photometry, and in return receives, from the photometry module 22, information representing the amounts of light received in the individual photometry areas so as to use the received information for exposure control. In flash shooting, the CPU 18 feeds the light-amount-control module 23 with an instruction requesting staring of light sensing, and in return receives, from the light-amount-control module 23, information representing the amounts of light received in the individual light-amount-control areas. The instruction requesting starting of light sensing is given in synchronism with the instruction requesting starting of light emission given to the flash control module 41.

When the contrast of the images formed on the sensors of the distance-measurement module 21 is too low to obtain appropriate distance-measurement information, the CPU 18 feeds an instruction to the auxiliary light module 24 to make it emit AF auxiliary light. To make distance-measurement information available for exposure control and for light amount control, AF auxiliary light is emitted as required even after the focus has been locked.

The operation unit 52 is provided with various operation members such as buttons and dials, and those operation members are each provided with a switch for communicating its operation state to the CPU 18. These switches include a switch S1, a switch S2, a mode switch SMODE, a self-timer switch SSELF, a preview switch SPV, a bracket switch SBR, a filter switch SFILT, and a preliminary light emission switch SPRE. The states of the individual switches are communicated to the CPU 18.

The switch S1 is closed when a release button (not shown) is pressed halfway in, and the switch S2 is closed when the release button is pressed fully in. The signals generated by closing the switches S1 and S2 are called the signals S1 and S2, respectively. The signal S1 requests starting of control operations. Thus, as long as the signal S1 is present, i.e. as long as the release button is kept pressed in halfway or more, the CPU 18 repeatedly performs a predetermined sequence of control operations that need to be performed to achieve shooting, such as generation of distance-measurement information, focus adjustment of the taking lens 30, and calculation of an exposure value.

The signal S2 requests starting of shooting, i.e. exposure of the film F. On receiving the signal S2, the CPU 18, in the release priority mode, opens the shutter 13 immediately, and, in the AF priority mode, opens the shutter 13 when the taking lens 30 is focused on the subject. At this time, in accordance with the exposure control mode selected, the shutter speed and the aperture value are set equal to the values calculated from the output of the photometry module 22 or specified by the user. In flash shooting, the CPU 18 makes the flash control module 41 emit illumination light and makes the light-amount-control module 23 sense the reflected illumination light.

The mode switch SMODE is for specifying the shooting mode, i.e., the AF priority mode or the release priority mode. The self-timer switch SSELF is for specifying self-timer shooting in which shooting is started a predetermined period of time after operation. The preview switch SPV is for specifying stopping down of the diaphragm 37 to the calculated or specified aperture value. The bracket switch SBR is for specifying bracket shooting in which a plurality of frames are sequentially shot while the exposure value is varied so as to include the optimum exposure value calculated. The filter switch SFILT is for detecting presence of a filter fitted to the taking lens 30. The preliminary light emission switch SPRE is for specifying preliminary emission of illumination light in flash shooting.

The operation unit 52 is further provided with various switches, though not shown, such as a power switch for specifying starting of supply of electric power, a switch for specifying an exposure control mode, and a switch for specifying automatic or manual focusing.

The display unit 53 includes a liquid crystal display (LCD) device and light-emitting diodes (LEDs), and displays various items of information related to the condition of the camera 1 such as the shooting mode, the exposure control mode, the number of remaining frames on the film F, the remaining power capacity of the power supply unit 51, and the focus condition of the taking lens 30. The display unit 53 is arranged on the top surface of the camera body 10 and around the pentagonal prism 15 within a viewfinder.

Figure 9:
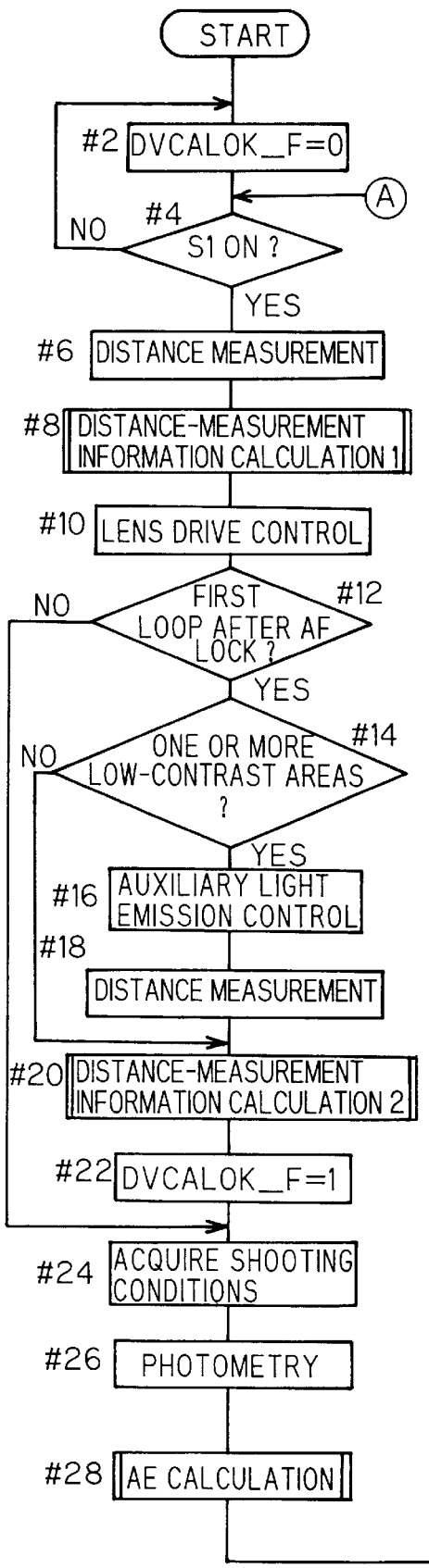
FIG. 9 is a flow chart showing the outline of the entire flow of control operations performed in the release priority mode.
Figure 9:
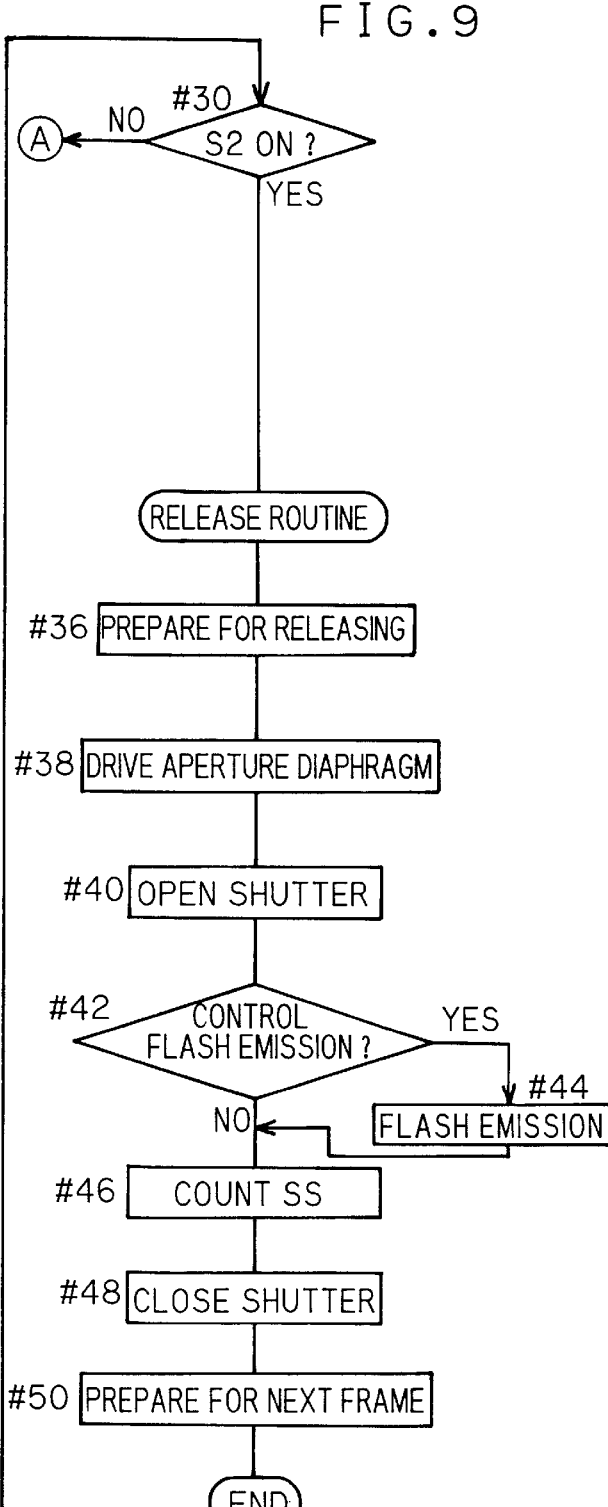

The flow of operations performed for focus adjustment, exposure control, and light amount control in the camera 1 will be described with reference to FIGS. 9 to 24. FIG. 9 is a flow chart showing the outline of the entire flow of control operations performed in the release priority mode. When this flow starts being executed, the CPU 18 sets a flag DVCALOK_F at 0 to clear it (step #2). This flag DVCALOK_F is for indicating whether distance-measurement information is available for all of the distance-measurement areas or not. The CPU 18 then checks whether the signal S1 is present or not (#4). If the signal S1 is absent, the flow returns to #2 to wait for the release button to be operated.

If the signal S1 is present, the distance-measurement module 21 is fed with an instruction to output distance-measurement data (#6), and calculations are performed to obtain distance-measurement information (#8). The distance-measurement information obtained here is used to achieve focus adjustment and focus condition checking, and in addition to achieve exposure control and light amount control on the basis of the position of the subject immediately before shooting. Next, in accordance with the distance-measurement information, driving of the focusing lens 31 of the taking lens 30 is controlled to drive it. Here, simply the AF actuator 32 is fed with an instruction to execute driving by a predetermined driving amount, and the flow does not wait for completion of driving. If, on the basis of the distance-measurement information obtained in #8, the taking lens is found to be focused on the subject, feeding the instruction to drive the AF actuator 32 is terminated, and thus the focus is locked.

Next, whether the focus has just been locked or not is checked (#12). As will be described later, the operations in steps #4 to #30 are repeated until the signal S2 is generated, and this step #12 allows checking of whether the focus has just been locked or not by checking whether it is the first time after the focus has been locked that this step is reached. If the focus has long (i.e. not just) been locked, the flow proceeds to #24.

If the focus has just been locked, then whether or not one or more distance-measurement areas show low contrast is checked (#14). The number of distance-measurement areas that show low contrast is set in a flag LOWCON_NO in the calculations performed in #8, and this value is checked. If no distance-measurement area shows low contrast, the flow proceeds to #20. If any distance-measurement area shows low contrast, the auxiliary light module 24 is instructed to emit AF auxiliary light (#16), and then distance-measurement data is obtained again from the distance-measurement module 21 under conditions using AF auxiliary light (#18).

Next, calculations are performed to obtain distance-measurement information (#20). These calculations are for obtaining distance-measurement information to be used for exposure control and light amount control, and thus are different from those performed in #8. In the calculations performed here, the distance-measurement data obtained in #6 is used if no distance-measurement area shows low contrast, and the distance-measurement data obtained in #18 is used if any distance-measurement area shows low contrast. Even if any distance-measurement area shows low contrast, emitting AF auxiliary light helps obtain higher contrast and thereby obtain distance-measurement information almost without fail even for such a distance-measurement area.

When the shooting range of a distance-measurement area is located at so remote a distance that AF auxiliary light does not reach, the contrast in that distance-measurement area remains low, but even then it is possible to obtain information indicating a remote distance. In this way, distance-measurement information is obtained for all of the distance-measurement areas. Then, the flag DVCALOK_F is set at 1 to indicate that distance-measurement information has been obtained for all of the distance-measurement areas (#22).

Next, information related to shooting conditions is acquired such as the focal length of the taking lens 30, the exposure control mode currently selected, whether preliminary emission of illumination light is requested or not, whether bounce illumination is requested or not, and whether a diffuser is attached or not (#24). Then, the photometry module 22 is fed with an instruction to detect the amount of ambient light received (#26), and then, based on the detected amount of received light and the distance-measurement information obtained in #20, AE calculations are performed to determine an exposure value (#28).

Now, all the operations preparatory to shooting are complete, and thus the camera can start shooting any time as soon as it is fed with an instruction to do so. Accordingly, whether the signal S2 generated when the release button is pressed fully in is present or not is checked (#30). If the signal S2 is absent, the flow returns to #4 to repeat the operations described above. If the user has already removed his finger 20 from the release button, then the signal S1 is also absent. In this case, the flow waits the signal S1 to be generated again, and then the operations in step #6 and the following steps are performed.

When the signal S2 is present, the flow proceeds to a release routine. First, preparatory operations are performed (#36); specifically, for example, the main mirror 11 is swung up so as to be retracted from the optical path and the shutter control unit 14 is charged to make the shutter 13 ready to be opened. Then, the diaphragm 37 is stopped down to the aperture value determined by the AE calculations performed in #28 (#38), and then the shutter is opened (#40). Then, whether illumination light needs to be emitted or not is checked (#42), and, if it needs to be emitted, the flash control module 41 is fed with an instruction to emit illumination light (#44). At the same time as the instruction to start light emission is given, the light-amount-control module 23 is fed with an instruction to start sensing light, and, when the amount of received light reaches the reference value determined in #28, emission of illumination light is stopped.

Furthermore, the length of time that has elapsed after the shutter was opened is measured (#46), and, when the lapse of time reaches the value of the shutter speed (SS) determined in #28, the shutter is closed (#48). Then, operations preparatory to the shooting of the next frame are performed; specifically, for example, the main mirror is restored to its original position and the film is fed (#50). This is the end of the release routine.

Figure 10:
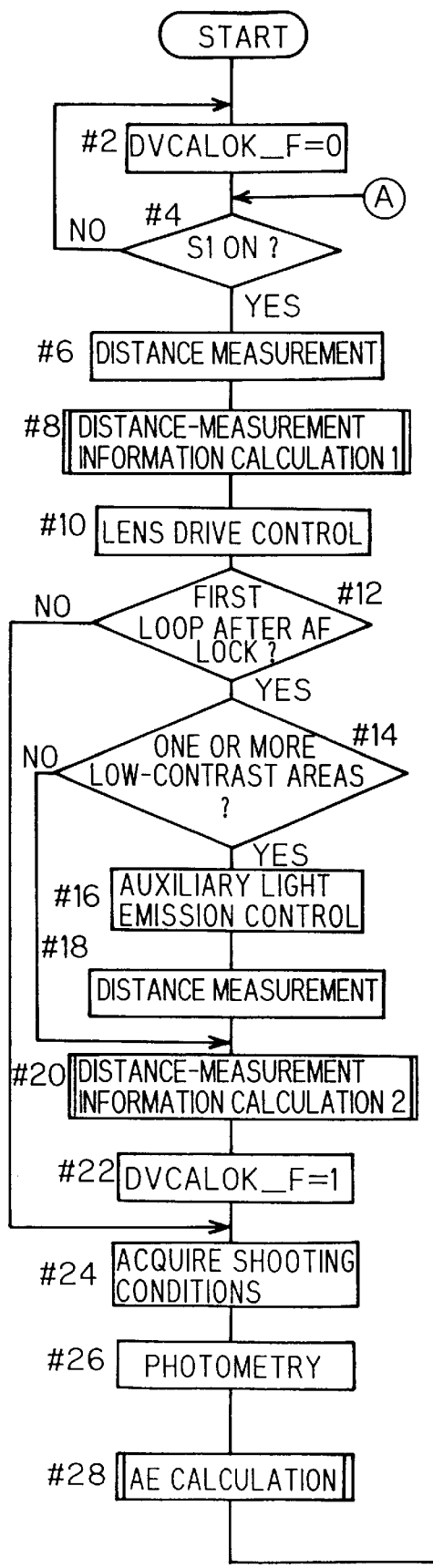
FIG. 10 is a flow chart showing the outline of the entire flow of control operations performed in the AF priority mode.
Figure 10:
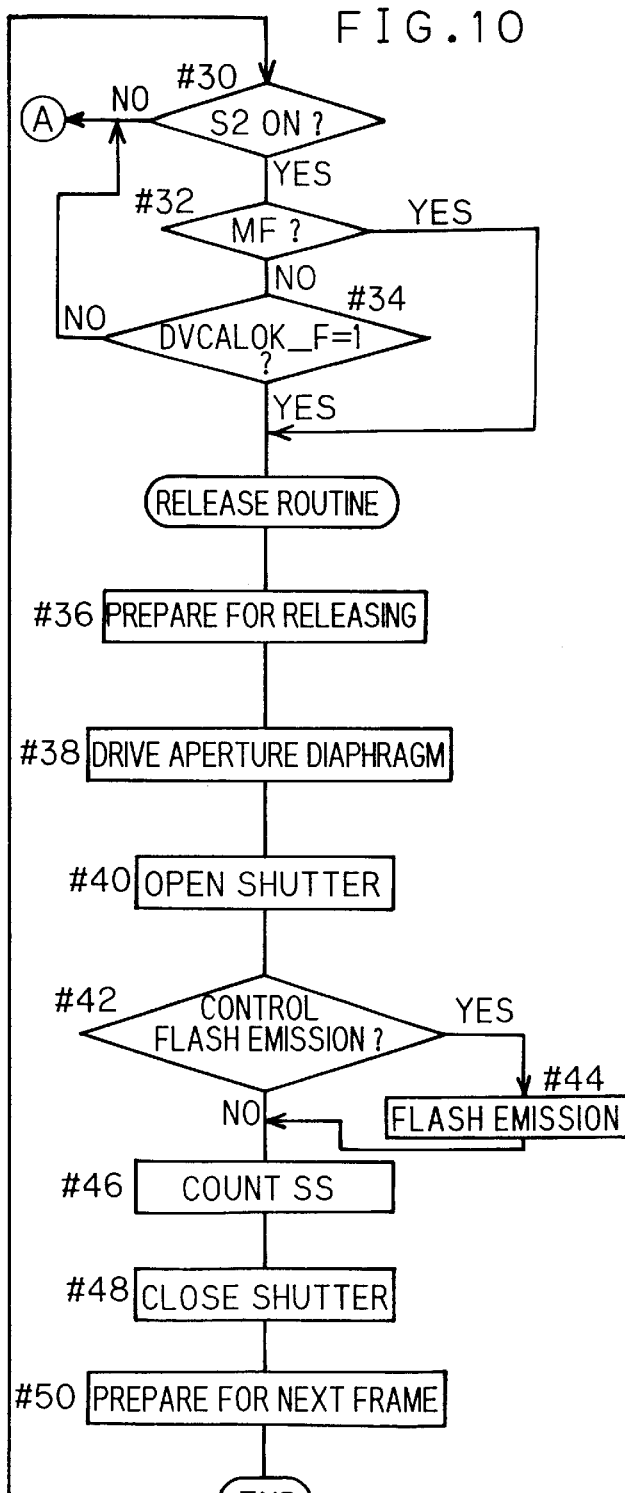

FIG. 10 is a flow chart showing the outline of the entire flow of control operations performed in the AF priority mode. The operations performed in the AF priority mode are different from those performed in the release priority mode in that additional steps #32 and #34 are inserted between steps #30 and #36.

In the AF priority mode, when starting of shooting is requested by the signal S2 (#30), whether manual focusing is selected or not is checked (#32). If manual focusing is selected, the flow proceeds to the release routine to perform the operations in step #36 and the following steps. If, instead of manual focusing, automatic focusing is selected, on the basis of whether the flag DVCALOK_F is 1 or not, whether distance-measurement information has been obtained for all of the distance-measurement areas or not, i.e. whether the focus has already been locked or not, is checked. (#34). If the flag DVCALOK_F is 1, the flow proceeds to the release routine; if the flag DVCALOK_F is 0, the flow returns to #4 to wait for the focus to be locked.

In manual focusing, the driving of the lens in step #10 is performed in accordance with manual operation by the user. The other operations are performed in the same manner as in the release priority mode, and therefore overlapping descriptions will not be repeated.

Now, the control operations will be described in more detail, taking as an example a case in which the distance-measurement module 21, the photometry module 22, and the light-amount-control module 23 are arranged as shown in FIG. 7. In the following descriptions, a distance-measurement area will be identified by a number n (n=1 to 3), a photometry area by a number k (k=0 to 13), and a light-amount-control area by a number m (m=0 to 3); accordingly, parameters corresponding to the distance-measurement area n, the photometry area k, and the light-amount-control area m will be represented by symbols ending with a letter n, k, and m, respectively. Moreover, the distance-measurement areas will be called islands, and the amount of light received in the photometry area k will be represented by the same symbol as the symbol BVk of the photometry area itself.

Figure 11:
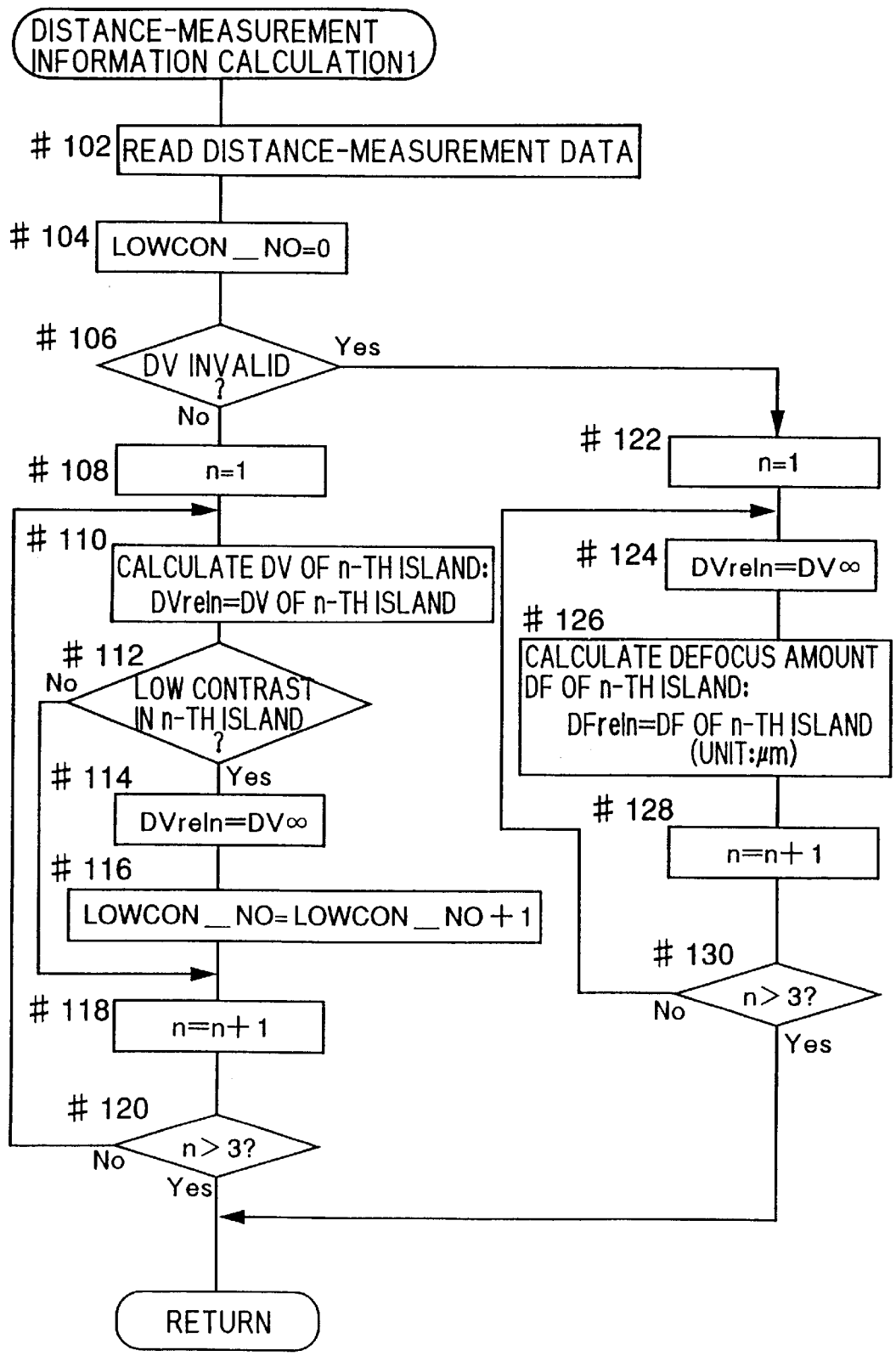
FIG. 11 is a flow chart showing the flow of operations for calculating the latest distance-measurement information.

FIG. 11 shows the flow of operations for calculating distance-measurement information, performed in step #8 shown in FIGS. 9 and 10. First, distance-measurement data is read in from the distance-measurement module 21 (step #102), and the flag LOWCON_NO, which indicates the number of distance-measurement areas showing low contrast, is set at 0 to clear it (#104). Then, whether or not it is possible to make effective use of the detected distance DV mentioned earlier is checked (#106).

If the absolute position of the focusing lens 31 is known, effective use of the detected distance DV is possible. In this case, a detected distance DVreln is determined for each island n (#108 to #120). Specifically, the detected distance DVreln is determined in the following manner. First, for each island n, irrespective of the contrast obtained there, the detected distance DV is calculated on the basis of the distance-measurement data and the absolute position of the focusing lens, and the value thus calculated is determined as the detected distance DVreln of each island n (#110). To simplify handling in the APEX system, the detected distances DV and DVreln are represented by the logarithms to base 2 of the calculated values given in meters.

Next, whether each island shows low contrast or not is checked (#112). If any island shows low contrast, the detected distance DVreln for that island n is replaced with a value DV∞, which is the value of DV corresponding to an infinite distance (#114), and then the flag LOWCON_NO, which indicates the number of distance-measurement areas showing low contrast, is incremented by 1 (#116). The value DV∞ is set equal to the maximum value that can be expressed, for example 255 where the value is expressed with one byte.

If the absolute position of the focusing lens 31 is not known, effective use of the detected distance DV is impossible. In this case, for each island n, the detected distance DVreln is made greater, and a defocus amount DFreln, which represents the distance between the image-formation location and the film F, is determined (#122 to #130). Specifically, for each island n, the detected distance DVreln is set equal to the value DV∞ corresponding to the infinite distance (#124), and, for each island n, the defocus amount DF is calculated and determined as the defocus amount DFreln (#126). The defocus amounts DF and DFreln are given in micrometers, and their values are positive or negative depending on whether the image-formation location is behind or in front of the film F, respectively.

Out of the defocus amounts DFreln thus determined, one having a small value is selected, taking also the degree of contrast into account, for use in focus adjustment and focus condition checking. Since these calculations are performed every time the flow reaches step #8 shown in FIGS. 9 and 10, the detected distances DVreln and the defocus amounts DFreln determined here are always updated to the latest values, and in shooting, the detected distances DVreln and the defocus amounts DFreln are the distance-measurement information immediately before a shot is taken.

Figure 12:
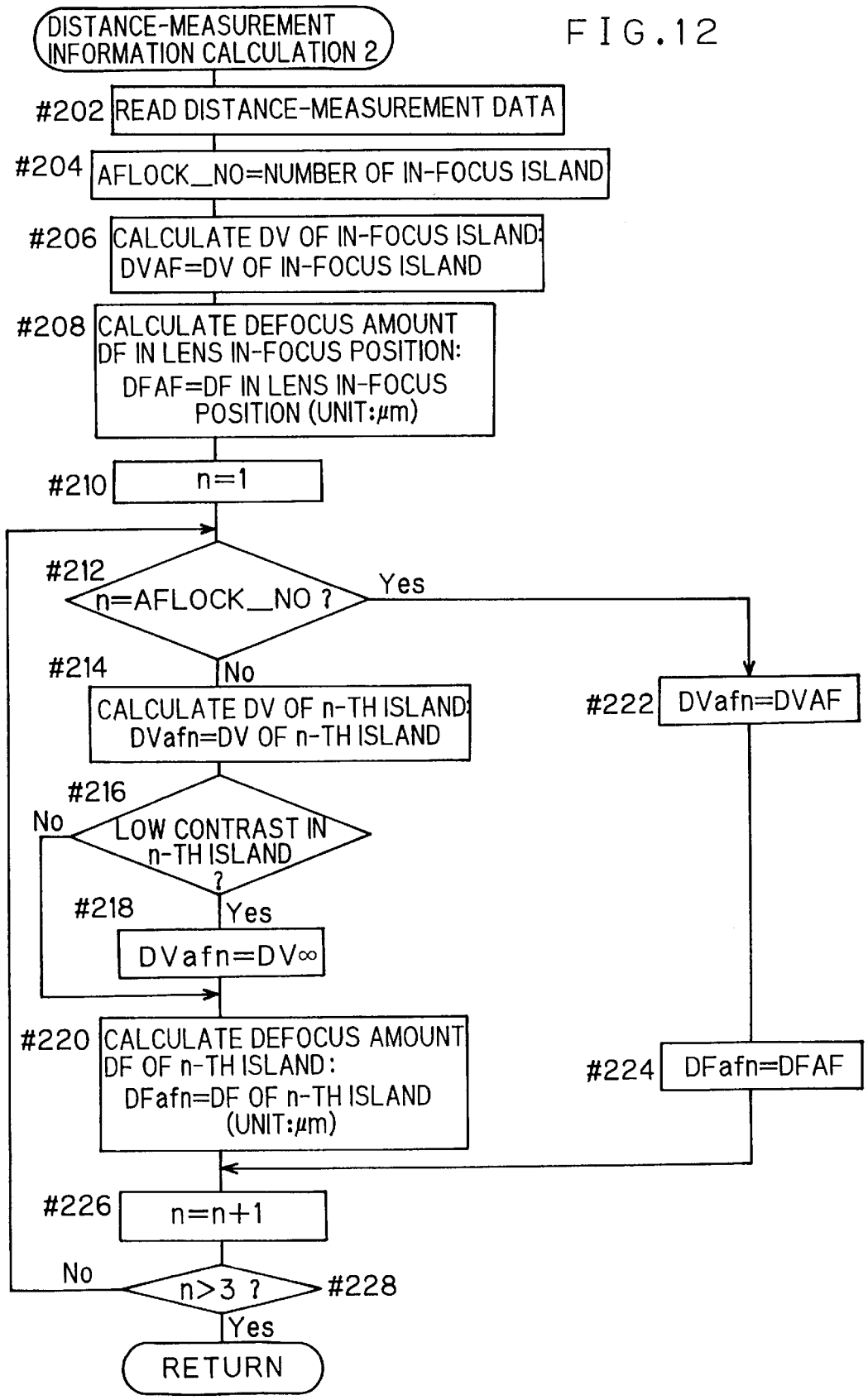
FIG. 12 is a flow chart showing the flow of operations for calculating distance-measurement information when the focus is locked.

FIG. 12 shows the flow of operations for calculating distance-measurement information, performed in step #20 shown in FIGS. 9 and 10. First, distance-measurement data is read in from the distance-measurement module 21 (step #202), and a flag AFLOCK_NO is set equal to the serial number of the island that was used to confirm that the taking lens 30 had been focused on the subject (this island is called the in-focus island) (#204). Then, for the in-focus island, the detected distance DV and the defocus amount DF are calculated and determined as the detected distance DVAF and the defocus amount DFAF for the in-focus island (#206 and #208).

Next, for each island n, the detected distance DVafn and the defocus amount DFafn are determined (#210 to #228). First, the serial number n of the island is compared with the value of the flag AFLOCK_NO to check whether the island is the in-focus island or not (#212). If the island n is the in-focus island, the detected distance DVafn and the defocus amount DFafn for that island are set equal to the detected distance DVAF and the defocus amount DFAF determined already (#222, #224).

If the island n is not the in-focus island, for that island, irrespective of the degree of contrast, the detected distance DV is calculated and determined as the detected distance DVafn (#214). Then, whether the island n shows low contrast or not is checked (#216), and, if it shows low contrast, the value of the detected distance DVafn is replaced with the value DV∞ corresponding to the infinite distance (#218). Next, for this island, the defocus amount DF is calculated and determined as the defocus amount DFafn (#220).

The detected distance DVafn and the defocus amount DFafn determined here are distance-measurement information as obtained when focus is achieved. Therefore, if the picture composition changes after focus is achieved, as when the user changes the direction of the camera or the subject moves, this information becomes inconsistent with the distance-measurement information in shooting.

Figure 13:
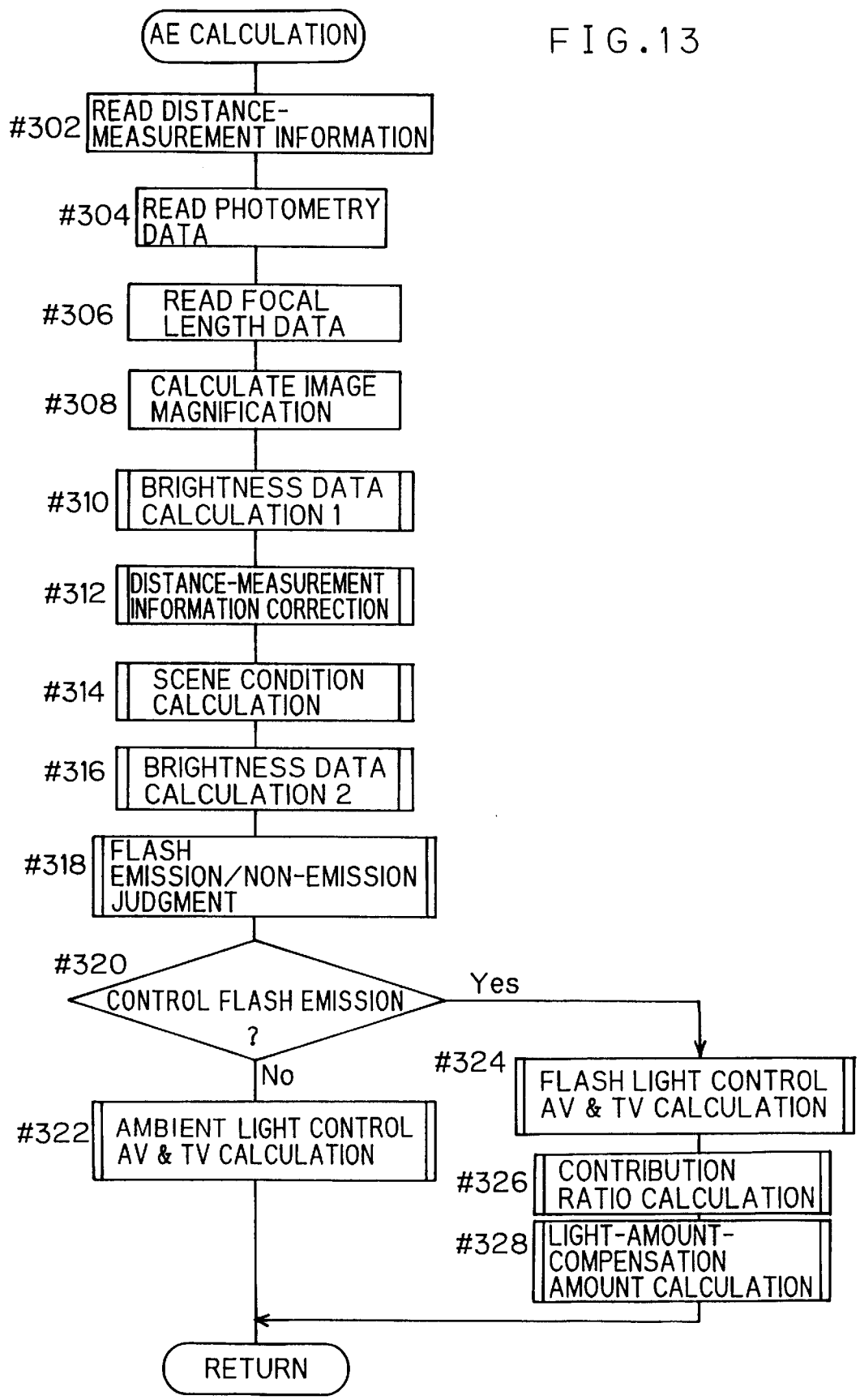
FIG. 13 is a flow chart showing the flow of operations for performing AE calculations related to automatic exposure.

FIG. 13 shows the flow of operations for performing AE calculations, performed in step #28 shown in FIGS. 9 and 10. First, the distance-measurement information obtained in steps #8 and #20, i.e. the detected distance DVreln and the defocus amount DFreln shown in FIG. 11 and the detected distance DVafn and the defocus amount DFafn, is read in (step #302), and the output of the photometry module 22 is read in (#304). In addition, the focal length fl of the taking lens 30 at that moment is read in (#306), and the image magnification β is calculated (#308).

Next, on the basis of the output of the photometry module 22, brightness data calculation operations are performed to determine the brightness BVCm of the regions corresponding to the individual light-amount-control areas (cells) m of the light-amount-control module 23 (#310). Then, on the basis of the brightness data thus obtained, the distance-measurement information obtained when focus was achieved and the latest distance-measurement information are corrected to obtain some control parameters (#312).

After correction of the distance-measurement information and calculation of the parameters that will be used later, scene condition calculation operations are performed to check the condition of the shooting scene and to check, by using the result, whether there has been a change in picture composition or not after the focus was locked (#314). Moreover, for use in exposure control and light amount control, on the basis of the amount of light sensed by the photometry module 22, brightness data calculation operations are performed to determine the brightness BVS of the subject, i.e. the main object included in the shooting target, and the brightness BVA of the background (#316). This calculation of the brightness data is performed in accordance with the scene condition by using different calculation methods depending on whether there has been a change in picture composition or not.

After calculating the brightens data, whether to perform flash shooting or not is checked (#318). The camera 1 is capable of both ambient-light shooting in which shooting is performed by using only ambient light and flash shooting in which shooting is performed by using illumination light emitted from the flash unit 40. Flash shooting includes backlighted flash shooting for situations in which the subject is dim and the background is bright, slow synchronized shooting in which, while a relatively dim subject is being shot at a long shutter speed under ambient light, the subject is brightened temporarily, in-the-dark light emission shooting for situations in which both the subject and the background are dim, and forced light emission shooting in which light is emitted forcibly at the user's request, and different methods are used to achieve exposure control in these four types of flash shooting. Slow synchronized shooting is requested by the user, however, in shooting under backlighted conditions, priority is given to backlighted flash shooting.

In #318, a flash emission request flag indicating whether to emit illumination light or not is set, and which one of the above-mentioned exposure control methods will be used is determined.

Next, on the basis of the value of the flash emission request flag, whether illumination light needs to be emitted or not is determined (#320). When no illumination light needs to be emitted, the aperture value AV and the shutter speed TV for ambient-light shooting are calculated (#322). When illumination light needs to be emitted, the aperture value AV and the shutter speed TV for flash shooting are calculated in accordance with the selected control method (#324), and in addition, for use in light amount control, the contribution ratios WTafm of the individual light-amount-control areas m are calculated on the basis of the distance-measurement information (#326), and the light-amount-compensation amount ΔEVB is calculated on the basis of the distance-measurement information (#328).

Figure 14:
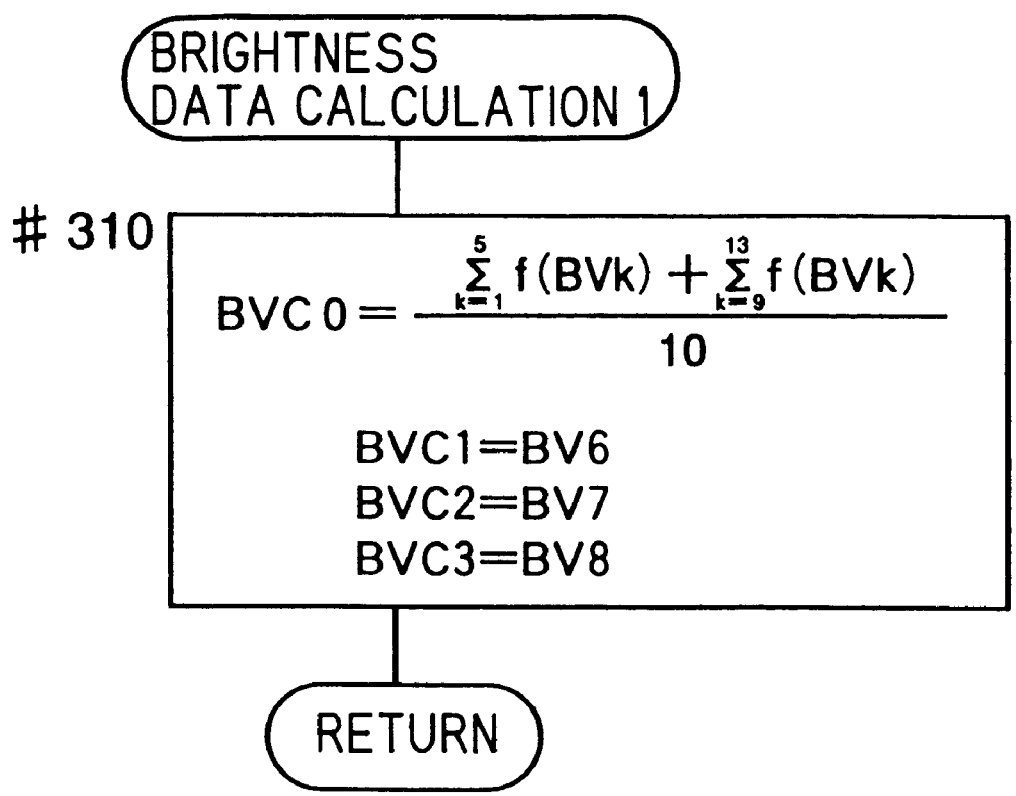
FIG. 14 is a flow chart showing the flow of operations for calculating brightness in the regions corresponding to the light-amount-control areas.

FIG. 14 shows the flow of operations for calculating the brightness BVCm corresponding to the light-amount-control areas, performed in step #310 shown in FIG. 13. The brightness BVC0 of the region corresponding to cell 0 is determined by processing the amounts of light received in the ten photometry areas BV1 to BV5 and BV9 to BV13 (i.e. the photometry areas other than the three at the center) by functional operations that determine their mean. The brightness of the regions corresponding to cells 1 to 3 is given as the amount of light received in the central photometry areas BV6 to BV8, respectively. The brightness BVC1 to BVC3 also represents the brightness of the island 1 to 3, respectively. To simplify handling in the APEX system, the amount of received light and the brightness are represented as logarithms to base 2.

The brightness BVC0 may be determined as a logarithmic mean, an exponential mean, or an anti-exponential mean. As the function f(BVk) for determining the mean, for example when a logarithmic mean, which requires the simplest formula, is determined, a function f(BVk)=BVk is used.

Figure 15:
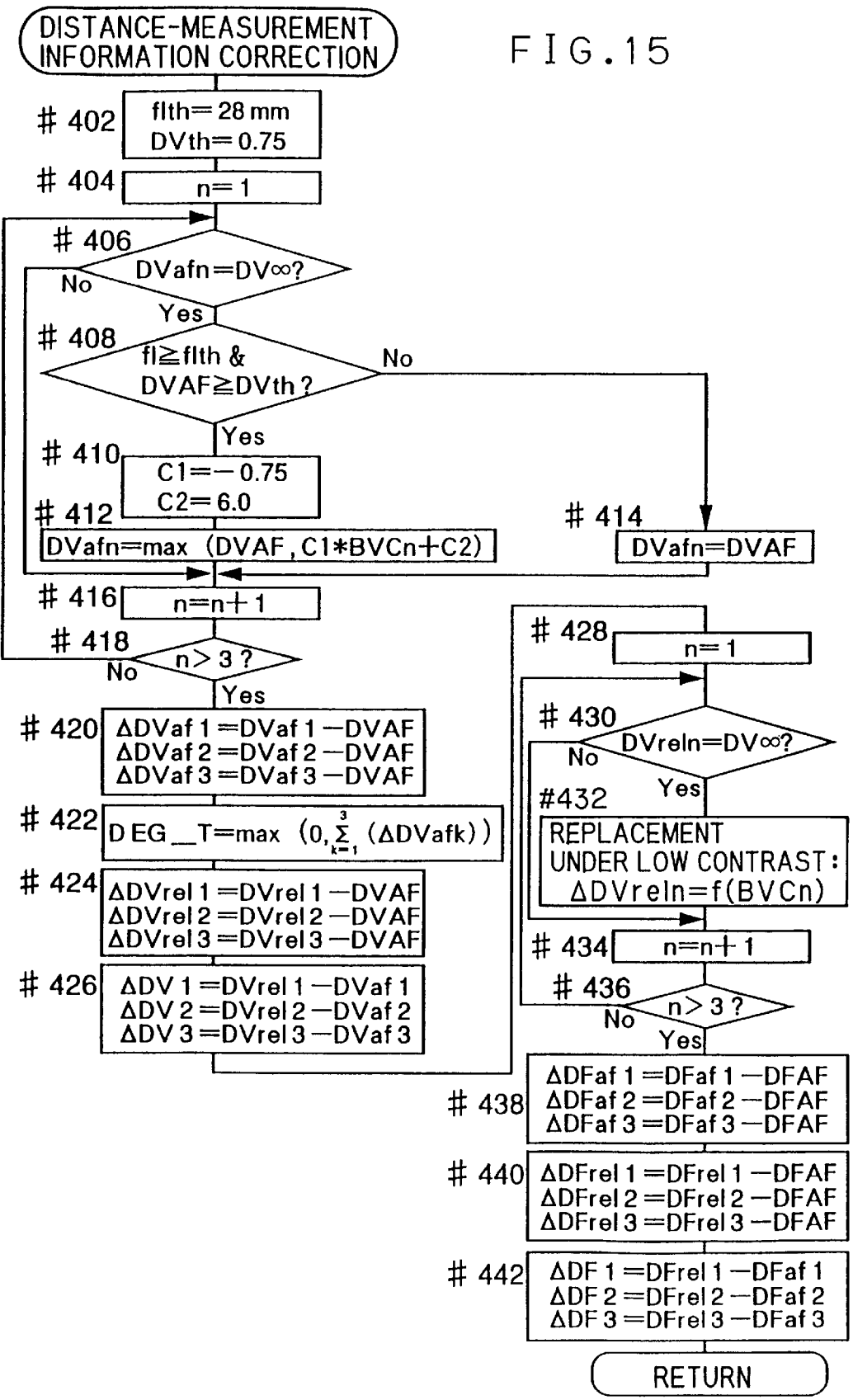
FIG. 15 is a flow chart showing the flow of operations for correcting distance-measurement information and for calculating control parameters.

FIG. 15 shows the flow of operations for correcting distance-measurement information and for calculating control parameters, performed in step #312 shown in FIG. 13. First, for each island n, the detected distance DVafn determined when focus was achieved is corrected (steps #404 to #418). This correction is performed only for those islands that showed low contrast when focus was achieved. To allow this correction to be performed in accordance with weather the shooting angle of view is larger than a predetermined value or not and whether the subject is located at a distance closer than a predetermined distance or not, threshold values are set in advance for the focal length and the detected distance (#402). Specifically, the threshold value flth for the focal length is set at 28 mm, and the threshold value DVth for the detected distance is set at 0.75.

Next, whether the detected distance DVafn equals to the value DV∞ or not is checked (#406). If the check result is false, no correction is performed. If the check result is true, i.e. if the island n showed low contrast when focus was achieved, whether or not the focal length fl is equal to or greater than the threshold value flth and in addition the detected distance DVAF of the in-focus island is equal to or greater than the threshold value DVth is checked (#408). If the check result is false, i.e. if the shooting angle of view is on the wide-angle side or the subject is located at a close distance, the detected distance DVafn is replaced with the detected distance DVAF of the in-focus island (#414).

If the check result in #408 is true, i.e. if the shooting angle of view is on the telephoto side and in addition the subject is not located at a close distance, two constants C1 and C2 are set (#410), and the detected distance DVafn is set equal to whichever is greater of the value obtained by multiplying the brightness BVCn of the photometry area corresponding to that island by the constant C1 and then adding the constant C2 to the resulting value and the detected distance DVAF of the in-focus island. Specifically, the constants C1 and C2 are set equal to −0.75 and 0.6, respectively.

After correcting the detected distance DVafn obtained when focus was achieved, a detected distance difference ΔDVafn is determined by subtracting the detected distance DVAF of the in-focus island from the detected distance DVafn of each island n obtained when focus was achieved (#420), and the sum of the three detected distance differences ΔDVafn is determined as the degree of background remoteness DEG_T indicating how far the background is away from the subject (#422). When the sum of the detected distance differences ΔDVafn is negative, the degree of background remoteness DEG_T is made equal to 0.

Moreover, a detected distance difference ΔDVreln is determined by subtracting the detected distance DVAF of the in-focus island obtained when focus was achieved from the latest detected distance DVreln of each island n (#422). Furthermore, for each island, a detected distance variation ΔDVn is determined by subtracting the detected distance DVafn obtained when focus was achieved from the latest detected distance DVreln (#426).

Next, for each island n, replacement of the latest detected distance difference ΔDVreln is performed (#428 to #436). This replacement is performed only for those islands that showed low contrast. First, whether the detected distance DVreln is equal to the value DV∞ or not is checked (#430). If the check result is false, no correction is performed. If the check result is true, the value obtained by performing functional operations on the brightness BVCn of the region corresponding to that island and the brightness of the regions corresponding to the other islands is determined as the detected distance difference ΔDVreln (#432). As this function f(BVCn), for example a function f(BVCn)=BVCn−(BVC0+BVC1+BVC2+BVC3)/4 is used.

After replacing the latest detected distance difference ΔDVreln, the defocus amount difference ΔDFafn is determined by subtracting the defocus amount DFAF of the in-focus island from the defocus amount DFafn of each island n obtained when focus was achieved (#438), and the defocus amount difference ΔDFreln is determined by subtracting the defocus amount DFAF of the in-focus island obtained when focus was achieved from the latest defocus amount DFreln of each island n (#440). Furthermore, for each island, the defocus amount variation ΔDFn is determined by subtracting the defocus amount DFafn obtained when focus was achieved from the latest defocus amount DFreln.

Figure 16:
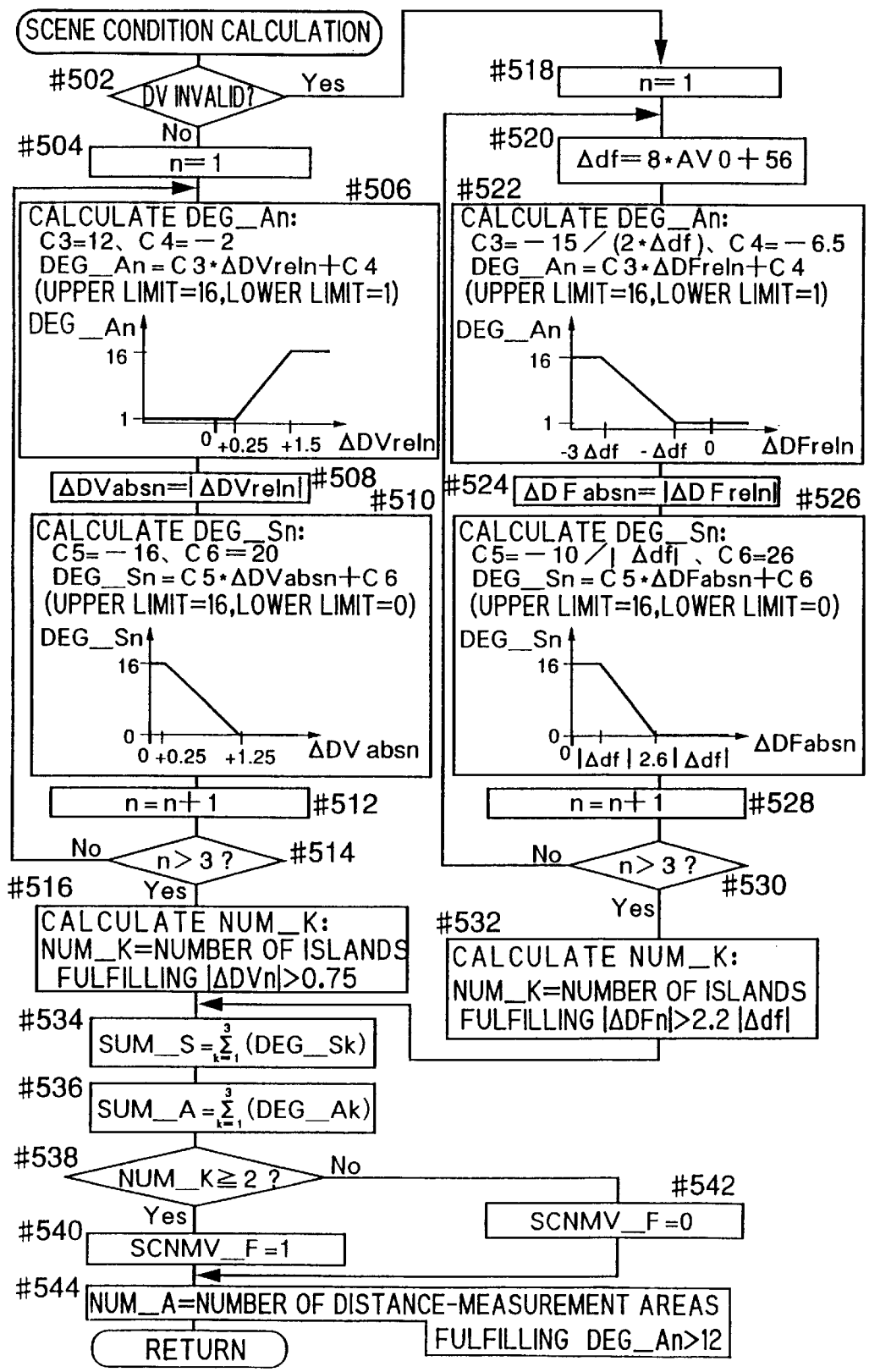
FIG. 16 is a flow chart showing the flow of operations for calculating the scene condition and for detecting a change in picture composition.

FIG. 16 shows the flow of operations for calculating the scene condition and for detecting a change in picture composition, performed in step #314 shown in FIG. 13. In these operations, the background degree DEG_An indicating the degree in which the object whose image is formed on each island n of the distance-measurement module 21 belongs to the background and the in-focus closeness degree DEG_Sn indicating the degree in which the distance to the object whose image is formed on each island n is close to the in-focus distance of the taking lens 30 are determined. First, whether effective use of the detected distance DV is possible or not is checked (step #502).

If the absolute position of the focusing lens 31 is known, effective use of the detected distance DV is possible. In this case, the background degree DEG_An and the in-focus closeness degree DEG_Sn are determined on the basis of the detected distance DV (#504 to #514). First, for each island, the background degree DEG_An is calculated (#506). The background degree DEG_An is determined by multiplying the latest detected distance difference ΔDVreln, which was determined in step #424 shown in FIG. 15 and partially replaced in #432, by a constant C3 and adding a constant C4 to the resulting value.

An upper and a lower limit are set on the background degree DEG_An. Specifically, the constants C3 and C4 are set equal to 12 and −2, respectively, and the upper and lower limits are set at 16 and 1, respectively. Here, the detected distance difference ΔDVreln corresponding to the upper and lower limits 16 and 1 is 1.5 and 0.25, respectively.

Next, the absolute value ΔDVabsn of the detected distance difference ΔDVreln is determined (#508), and then the in-focus closeness degree DEG_Sn is calculated (#510). The in-focus closeness degree DEG_Sn is determined by multiplying the absolute value ΔDVabsn of the detected distance difference by a constant C5 and adding a constant C6 to the resulting value. An upper and a lower limit are set also on the in-focus closeness degree DEG_Sn. Specifically, the constants C5 and C6 are set equal to −16 and 20, respectively, and the upper and lower limits are set at 16 and 0, respectively. The absolute value ΔDVabsn corresponding to the upper and lower limits 16 and 0 is 0.25 and 1.25, respectively.

Then, the number of islands in which a change has occurred in the detected distance as a result of a change in picture composition after focus was achieved is determined as the number of composition change islands NUM_K (#516). Whether there has been a change in the detected distance or not is checked by checking whether the absolute value of the detected distance variation ΔDVn calculated for each island in step #426 shown in FIG. 15 exceeds a predetermined value, for example 0.75, or not.

When the absolute position of the focusing lens 31 is not known, effective use of the detected distance DV is impossible. In this case, the background degree DEG_An and the in-focus closeness degree DEG_Sn are determined on the basis of the defocus amount DF (#518 to #530). First, the range width Δdf of the defocus amount DF to be used for focus condition checking is set on the bases of the open aperture value of the diaphragm 37 (#520). Specifically, the value obtained by multiplying by 8 the open aperture value AV0 given as an APEX-system-complying value and then adding 56 to the resulting value is determined as the focus condition checking range width Δdf. This value is given in micrometers.

Then, for each island n, the background degree DEG_An is calculated (#522). The background degree DEG_An is obtained by multiplying the latest defocus amount difference ΔDFreln obtained in step #440 shown in FIG. 15 by a constant C3 and adding a constant C4 to the resulting value. An upper and a lower limit are set on the background degree DEG_An. Specifically, the constants C3 and C4 are set equal to −15/( 2·Δdf) and −6.5, respectively, and the upper and lower limit are set at 16 and 1, respectively. Here, the defocus amount difference ΔDFreln corresponding to the upper and lower limits 16 and 1 are −3. Δdf and −Δdf, respectively.

Next, the absolute value ΔDFabsn of the defocus amount difference ΔDFreln is determined (#524), and then the in-focus closeness degree DEG_Sn is calculated (#526). The in-focus closeness degree DEG_Sn is obtained by multiplying the absolute value ΔDFabsn of the defocus amount difference by a constant C5 and adding a constant C6 to the resulting value. An upper and lower limit are set also on the infocus closeness degree DEG_Sn. Specifically, the constants C5 and C6 are set equal to −10/|Δdf| and 26, respectively, and the upper and lower limits are set at 16 and 0, respectively. The absolute value ΔDFabsn corresponding to the upper and lower limits 16 and 0 is |Δdf| and 2.6·|Δdf|, respectively.

Then, the number of islands in which a change has occurred in the defocus amount as a result of a change in picture composition after focus was achieved is determined as the number of composition change islands NUM_K (#532). Whether there has been a change in the defocus amount or not is checked by checking whether the absolute value of the defocus amount variation ΔDFn calculated for each island in step #442 shown in FIG. 15 exceeds a predetermined value, for example the absolute value of the focus condition checking range width Δdf multiplied by 2.2.

Thereafter, the sum SUM_S of the in-focus closeness degree DEG_Sn of all of the distance-measurement areas n is determined (#534), and the sum SUM_A of the background degree DEG_An of all of the distance-measurement areas n is determined (#536). Then, whether or not the number of composition change islands NUM_K is equal to or greater than 2 is checked (#538), and a composition change flag SCNMV_F, which indicates whether there has been a change in picture composition in the entire frame or not, is set at 1 if the number of composition change islands NUM_K is equal to or greater than 2 (#540) and at 0 when the number of composition change islands NUM_K is smaller than 2 (#542).

Lastly, for use in light amount control, the number NUM_A of background areas indicating the number of islands corresponding to the background is determined (#544). Specifically, the islands whose background degree DEG_An is greater than 12 are recognized as background areas.

Figure 17:
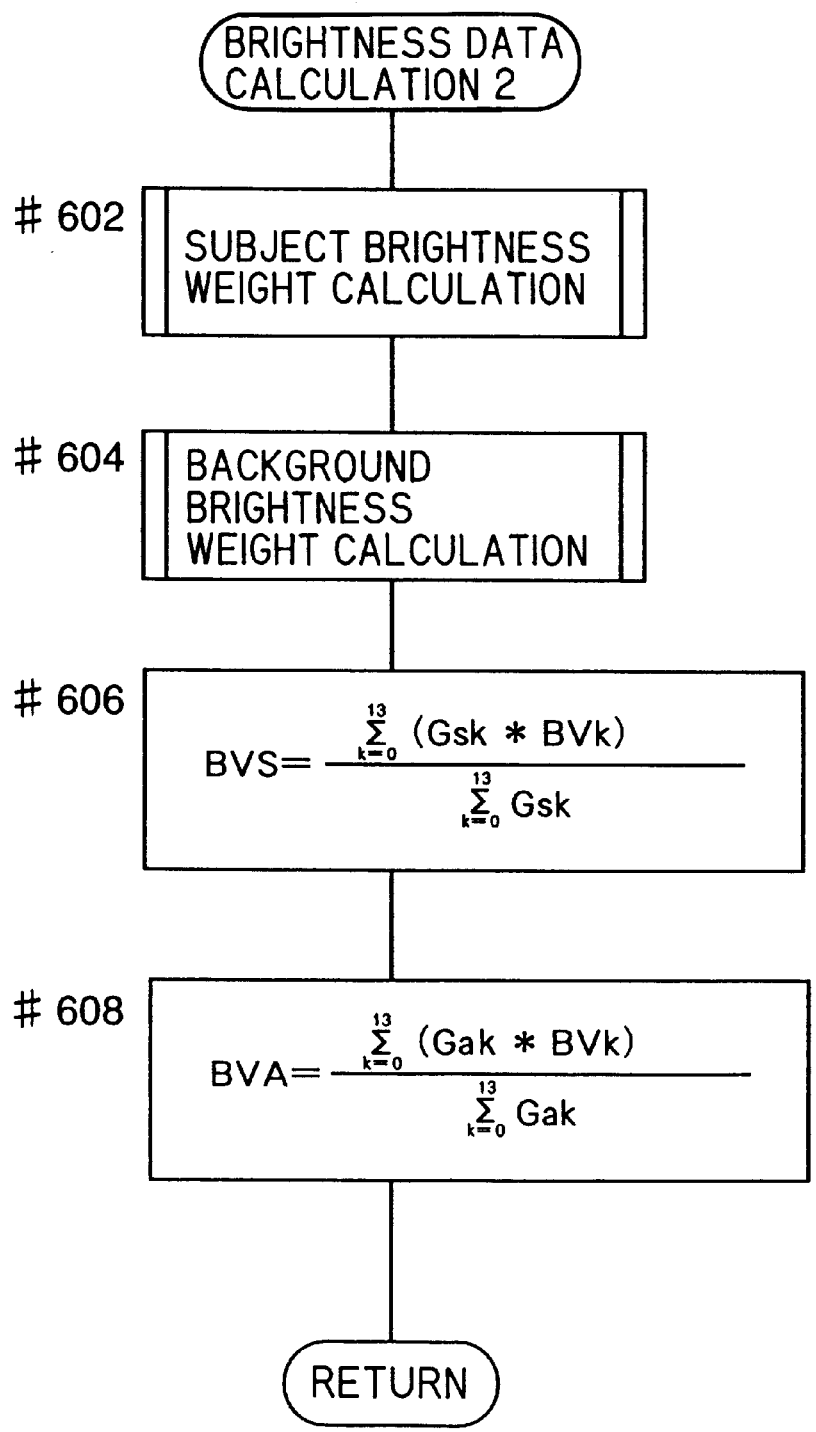
FIG. 17 is a flow chart showing the flow of operations for calculating the subject brightness and the background brightness.

FIG. 17 shows the flow of operations for calculating the subject brightness BVS and the background brightness BVA, performed in step #316 shown in FIG. 13. The brightness BVA and BVS are each determined as the sum of the weighted amount BVk of light received in the individual photometry areas. Different sets of weights are used for the subject and for the background. First, for each photometry area, the weight Gsk for the subject and the weight Gak for the background are set (steps #602 and #604). As will be described later, these weights Gsk and Gak are variable.

Next, for all of the 14 photometry areas, the amount BVk of received light is multiplied by the weight Gsk for the subject, and then the sum of the resulting values is determined; the determined sum is then divided by the sum of the weights Gsk to obtain the subject brightness BVS (#606). Similarly, for all of the 14 photometry areas, the amount BVk of received light is multiplied by the weight Gak for the background, and then the sum of the resulting values is determined; the determined sum is then divided by the sum of the weights Gak to obtain the background brightness BVA (#608).

Figure 18:
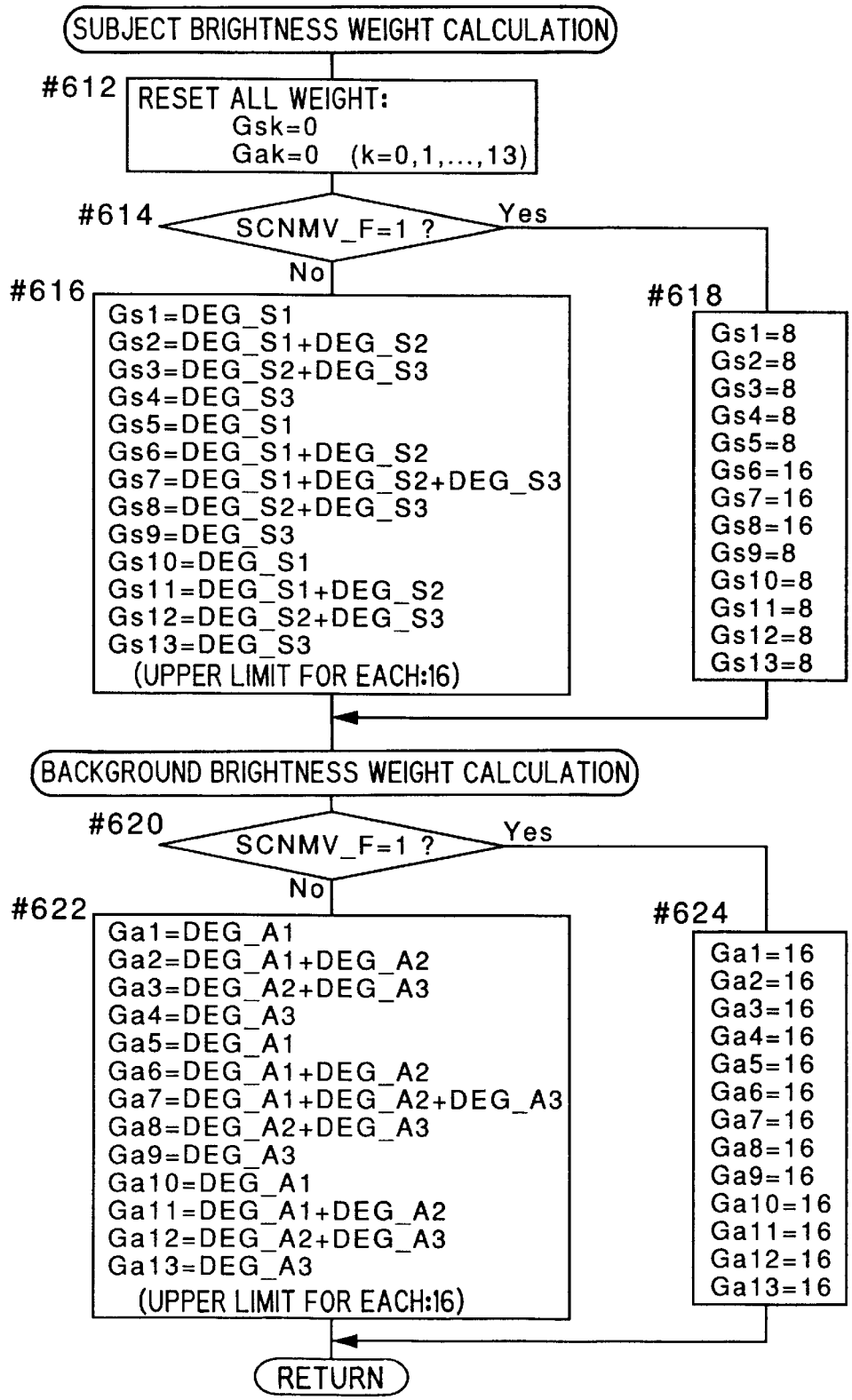
FIG. 18 is a flow chart showing the flow of operations for setting weights for the photometry areas.

FIG. 18 shows the flow of operations for setting weights, performed in steps #602 and 604 above. First, the weight Gsk for the subject and the weight Gak for the background are set equal to 0 for all of the photometry areas (step #612).

Then, the weight Gsk for the subject is set individually for each photometry area (#614 to #618). At this time, the composition change flag SCNMV_F is checked to check whether or not there has been a change in picture composition after focus was achieved (#614) so that different settings will be made in accordance with whether there has been a change in picture composition or not.

If there has been no change in picture composition, for each photometry area, the weight Gsk for the subject is set on the basis of the in-focus closeness degree DEG_Sn of the island corresponding or adjacent thereto (#616). Specifically, for the leftmost photometry areas BV1, BV5, and BV10 of the lower, central, and upper rows, the in-focus closeness degree DEG_S1 of the left-hand island 1 is used as the weights Gs1, Gs5, and Gs10. For the rightmost photometry areas BV4, BV9, and BV13 of the three rows, the in-focus closeness degree DEG_S3 of the right-hand island 3 is used as the weights Gs4, Gs9, and Gs13.

For the left-hand central photometry areas BV2, BV6, and BV11 of the three rows, the sum of the in-focus closeness degrees DEG_S1 and DEG_S2 of the left-hand and central islands 1 and 2 is used as the weights Gs2, Gs6, and Gs11. For the right-hand central photometry areas BV3, BV8, and BV12 of the three rows, the sum of the in-focus closeness degrees DEG_S2 and DEG_S3 of the central and right-hand islands 2 and 3 is used as the weights Gs3, Gs8, and Gs12. For the central photometry area BV7, the sum of the in-focus closeness degrees DEG_S1, DEG_S2, and DEG_S3 of the three islands 1, 2, and 3 is used as the weight Gs7. An upper limit is set on the weight Gsk so that the weight Gsk is set equal to 16 when the value obtained above is greater than 16.

If there has been a change in picture composition, for each photometry area, the weight Gsk for the subject is set equal to a value determined in advance (#618). Specifically, for the three central photometry areas BV6 to BV8 of the central row, the weights Gs6 to Gs8 are set equal to 16, and for the other photometry areas BV1 to BV5 and BV9 to BV13, the weights Gs1 to Gs5 and Gs9 to Gs13 are set equal to 8. These settings allow exposure control to be performed on the basis of center-weighted averaging metering.

Next, the weight Gak for the background is set individually for each photometry area (#620 to #624). At this time, the composition change flag SCNMV_F is checked to check whether or not there has been a change in picture composition after focus was achieved (#620) so that different settings will be made in accordance with whether there has been a change in picture composition or not.

If there has been no change in picture composition, for each photometry area, the weight Gak for the background is set on the basis of the background degree DEG_An of the island corresponding or adjacent thereto (#622). This setting is performed in quite the same manner as the setting of the weight Gsk for the subject.

If there has been a change in picture composition, for each photometry area, the weight Gak for the background is set equal to a value determined in advance (#618). Specifically, the weights Ga1 to Ga13 for all of the photometry areas BV1 to BV13 excluding the photometry area BV0 are set equal to 16. These settings allow exposure control to be performed on the basis of averaging metering.

The weights Gsk and Gak used when there has been no change in picture composition may be set in a manner other than described above on the basis of the infocus closeness degree DEG_Sn and the background degree DEG_An, respectively. Moreover, it is also possible to set the weights Gsk and Gak used when there has been a change in picture composition on the basis of the in-focus closeness degree DEG_Sn and the background degree DEG_An, respectively.

However, when there has been a change in picture composition, there is no guarantee that the subject corresponds to any of the islands, and, even if it does, there is no guarantee that sufficiently high contrast is obtained. Accordingly, the in-focus closeness degree DEG_Sn is not always reliable; similarly, the background degree DEG_An is not always reliable. Therefore, when there has been a change in picture composition, it is preferable to set the weights Gsk and Gak to be fixed values because, then, it is more likely to achieve appropriate exposure than when they are set on the basis of the in-focus closeness degree DEG_Sn and the background degree DEG_An.

Figure 19:
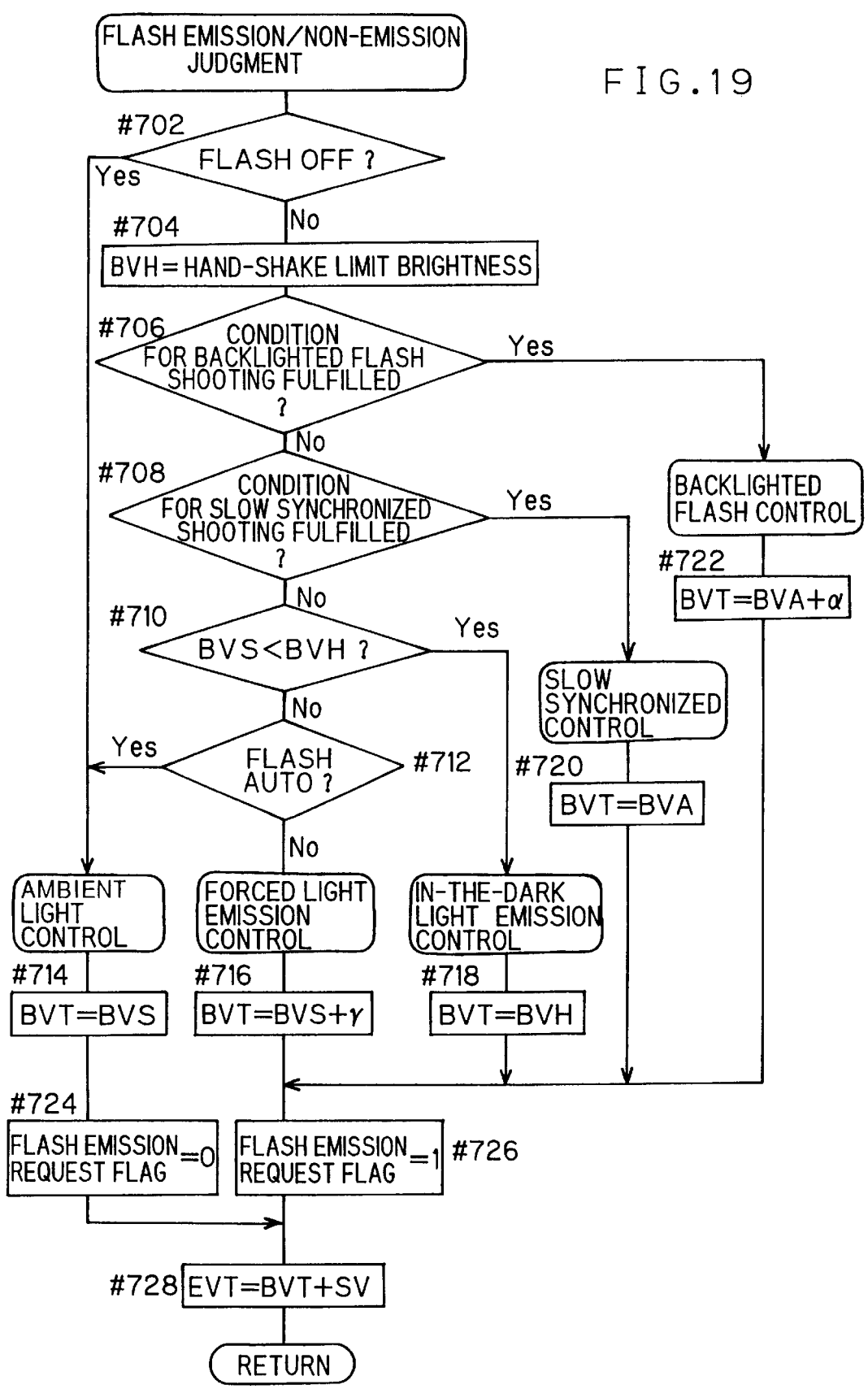
FIG. 19 is a flow chart showing the flow of operations for determining whether to use flash illumination and for selecting a mode of exposure control.

FIG. 19 shows the flow of operations for determining whether to use flash illumination and for selecting a mode of exposure control, performed in step #318 shown in FIG. 13. First, whether the flash control module 41 is connected or not is checked (step #702). If the flash control module 41 is not connected, the flash unit 40 is not fed with electric power, and therefore ambient-light control is performed. In ambient-light control, the subject brightness BVS calculated in step #606 shown in FIG. 17 is used as the control brightness BVT (#714), and a flash emission request flag indicating whether flash emission is required or not is set at 0 (#724).

If the flash control module 41 is connected, i.e. if the flash unit 40 is fed with electric power, first, a predetermined value is set as the hand-shake limit brightness BVH (#704). Thereafter, whether the condition for backlighted flash shooting is satisfied or not is checked (#706), whether the condition for slow synchronized shooting is satisfied or not is checked (#708), and whether the subject brightness is lower than the hand-shake limit brightness or not is checked (#710).

The condition for backlighted flash shooting is satisfied when the background brightness is far higher than the subject brightness. This checking is performed on the basis of the amount of light received in the individual photometry areas. When the condition for backlighted flash shooting is satisfied, backlighted flash control is performed. In backlighted flash control, the value obtained by adding a predetermined compensation amount a to the background brightness BVA calculated in step #608 shown in FIG. 17 is used as the control brightens BVT (#722).

When the user has requested slow synchronized shooting, the condition for slow synchronized shooting is regarded as satisfied, and slow synchronized control is performed. In slow synchronized control, the background brightness BVA is used as the control brightness BVT (#720).

When the subject brightness BVS is lower than the hand-shake limit brightness BVH, in-the-darkness light emission control is performed. In in-the-darkness light emission control, the hand-shake limit brightness BVH is used as the control brightness BVT (#718).

If none of the above-mentioned conditions is satisfied, whether the control mode of the flash unit 40 is set for an automatic light emission control mode or not is checked (#712). The control mode of the flash unit 40 is set by the user either for an automatic light emission control mode or for a forced light emission control mode. In the automatic light emission control mode, whether to use flash emission or not is automatically determined in accordance with shooting conditions. In the forced light emission control mode, flash emission is used regardless of shooting conditions.

If, in step #712, the automatic light emission control mode is specified, it is recognized that there is no need to use flash emission, and therefore ambient-light control is performed. Specifically, the subject brightness BVS is used as the control brightness BVT (#714). If the forced light emission control mode is specified, the value obtained by adding a predetermined compensation amount γ to the subject brightness BVS is used as the control brightness BVT (#716). In the following descriptions, forced light emission control, in-the-darkness light emission control, slow synchronized control, and backlighted flash control will be collectively referred to as flash light control. In flash light control, the flash emission request flag is set at 1 (#726).

The value obtained by adding the film sensitivity SV to the control brightness BVT obtained above is used as the control exposure EVT (#728). Note that the film sensitivity SV is read in previously when the film is loaded.

Figure 20:
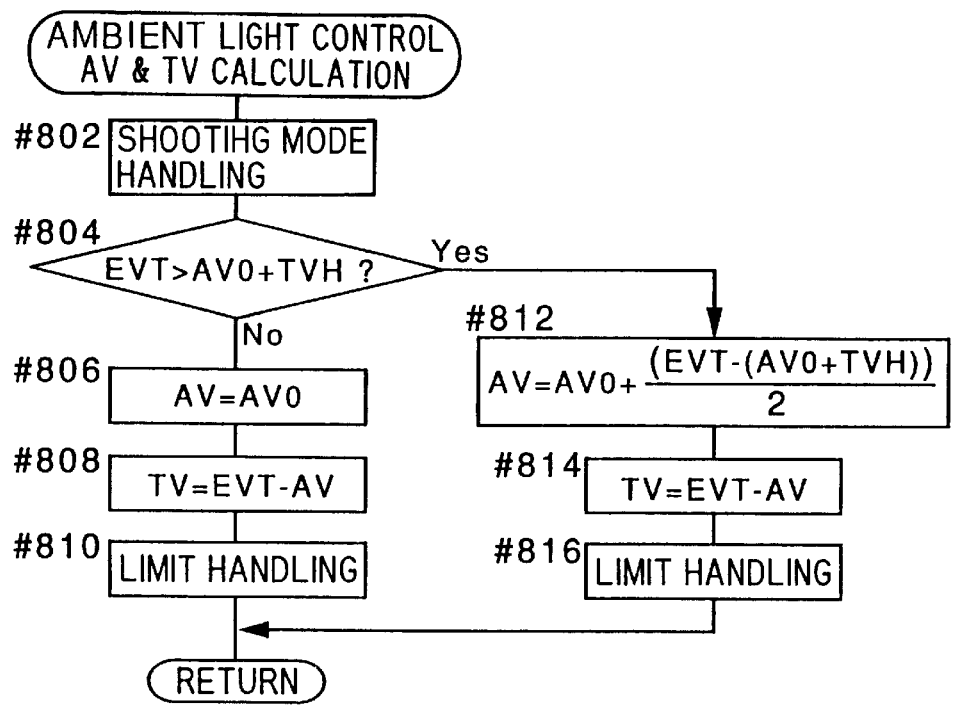
FIG. 20 is a flow chart showing the flow of operations for calculating the aperture value and the shutter speed for ambient-light shooting.

FIG. 20 shows the flow of operations for calculating the aperture value AV and the shutter speed TV for ambient-light shooting, performed in step #322 shown in FIG. 13. First, which exposure control mode is currently specified is read in (step #802). If any of the shutter priority mode, the aperture priority mode, or the manual mode is specified, the shutter speed, or the aperture value, or both are set in accordance with the specified values.

If the program mode is specified, whether or not the control exposure EVT calculated in step #728 shown in FIG. 19 is greater than the value obtained by adding a hand-shake limit shutter speed TVH to the open aperture value AV0 is checked (#804). If not, the aperture value AV is set equal to the open aperture value AV0 (#806), and the shutter speed TV is set equal to the value obtained by subtracting the aperture value AV from the control exposure EVT (#808). If the thus calculated shutter speed TV is smaller than the minimum shutter speed TVmin, limit handling operations are performed to set the shutter speed TV equal to the minimum shutter speed TVmin (#810).

If the control exposure EVT is greater than the value obtained by adding the hand-shake limit shutter speed TVH to the open aperture value AV0, the aperture value AV is set equal to AV=AV0+(EVT−(AV0+TVH))/2 (#812). Then, the shutter speed TV is set equal to the value obtained by subtracting the aperture value AV from the control exposure EVT (#814). If the aperture value AV is greater than the minimum aperture value AVmax, limit handling operations are performed to set the aperture value AV equal to the minimum aperture value AVmax and set the shutter speed TV equal to the value obtained by subtracting the minimum aperture value AVmax from the control exposure EVT (#816). If the shutter speed TV is greater than the maximum shutter speed TVmax, limit handling operations are performed to set the shutter speed TV equal to the maximum shutter speed TVmax (#816).

Figure 21:
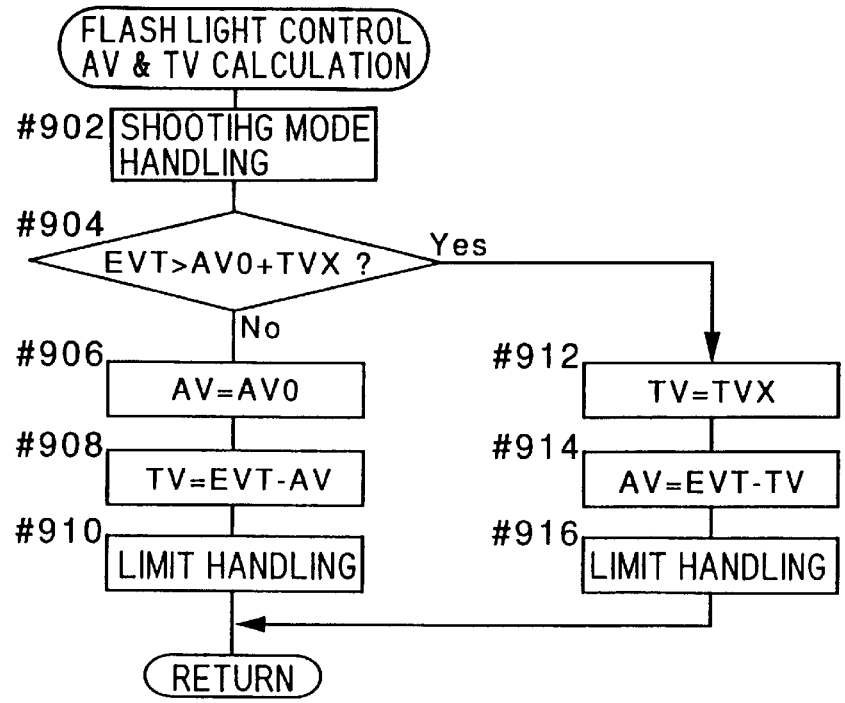
FIG. 21 is a flow chart showing the flow of operations for calculating the aperture value and the shutter speed for flash shooting.

FIG. 21 shows the flow of operations for calculating the aperture value AV and the shutter speed TV for flash shooting, performed in step #324 shown in FIG. 13. First, which exposure control mode is currently specified is read in (step #902). If any of the shutter priority mode, the aperture priority mode, or the manual mode is specified, the shutter speed, or the aperture value, or both are set in accordance with the specified values.

When the program mode is specified, whether or not the control exposure EVT calculated in step #728 shown in FIG. 19 is greater than the value obtained by adding a synchronization speed TVX to the open aperture value AV0 is checked (#904). In flash light control in the program mode, to ensure even illumination by flash emission, flash emission is controlled so as to take place when the shutter is fully open. The maximum shutter speed that does not cause uneven illumination by flash emission is determined as the synchronization speed TVX; that is, as long as the shutter speed TV is lower than the synchronization speed TVX, even illumination is achieved.

If the control exposure EVT is not greater than the value obtained by adding the synchronization speed TVX to the open aperture value AV0, the aperture value AV is set equal to the open aperture value AV0 (#906), and the shutter speed TV is set equal to the value obtained by subtracting the aperture value AV from the control exposure EVT (#908). If the shutter speed TV is smaller than the minimum shutter speed TVmin, limit handling operations are performed to set the shutter speed TV equal to the minimum shutter speed TVmin (#910).

If the control exposure EVT is greater than the value obtained by adding the synchronization speed TVX to the open aperture value AV0, the shutter speed TV is set equal to the synchronization speed TVX (#912), and the aperture value AV is set equal to the value obtained by subtracting the shutter speed TV from the control exposure EVT (#914). If the aperture value AV is greater than the minimum aperture value AVmax, limit handling operations are performed to set the aperture value AV equal to the minimum aperture value AVmax (#916).

Figure 22:
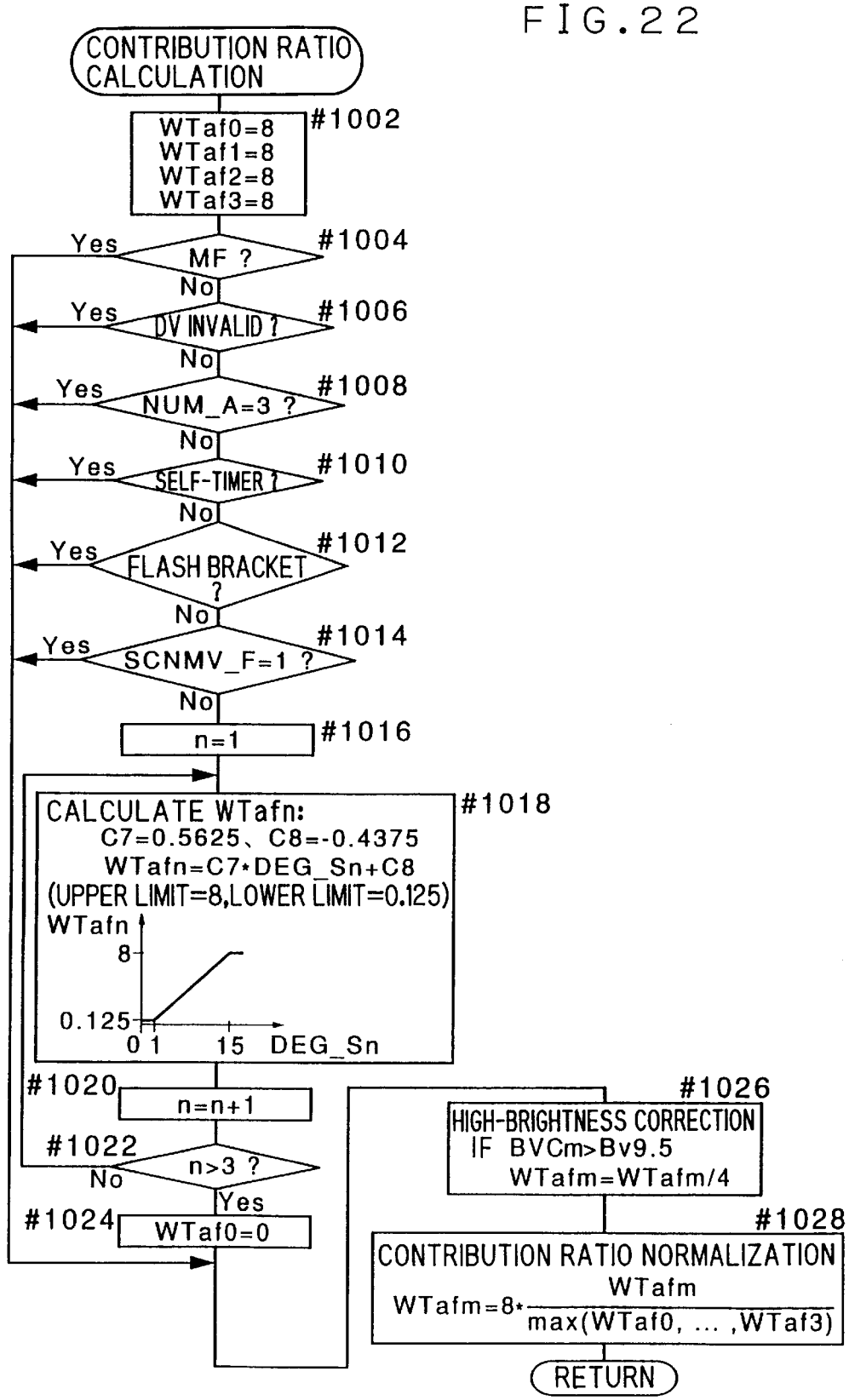
FIG. 22 is a flow chart showing the flow of operations for calculating the contribution ratios of the light-amount-control areas.

FIG. 22 shows the flow of operations for calculating the contribution ratios WTafm of the individual light-amount-control areas (cells) m, performed in step #326 shown in FIG. 13. Note that the contribution ratio of the light-amount-control area m corresponding to the distance-measurement area n (m=n) is represented by WTafn. For shooting under normal conditions, the contribution ratios WTafm are calculated on the basis of the in-focus closeness degree DEG_Sn of the individual distance-measurement areas n; however, under particular shooting conditions, it is often better to set them to be fixed values. Accordingly, first, the contribution ratios of all of the four light-amount-control areas 0 to 3 are set equal to 8 (step #1002).

Next, whether particular conditions are satisfied or not is checked (#1004 to #1014). Specifically, whether manual focusing is specified or not is checked (#1004), whether effective use of the detected distance DV is possible or not is checked (#1006), whether the number NUM_A of background areas is equal to 3 or not, i.e. whether all of the distance-measurement areas belong to the background or not, is checked (#1008), whether self-timer shooting is specified or not is checked (#1010), whether flash bracket shooting is specified or not is checked (#1012), and whether the flag SCNMV_F is equal to 1 or not, i.e. whether or not there has been a change in picture composition after focus was achieved is checked (#1014). If the result of any of these checks is true, the flow proceeds to #1026 to use the values set in #1002 intact as the contribution ratios WTafm.

The reasons are as follows. In manual focusing, there is no guarantee that the taking lens is focused on the subject, and therefore the in-focus closeness degree DEG_Sn is unreliable. Self-timer shooting is often performed where ambient light is insufficient and thus the in-focus closeness degree DEG_Sn is likely to be unreliable. Flash bracket shooting is performed to shoot a plurality of frames sequentially while the amount of emitted light is varied, and the purpose of such shooting is more easily achieved when the contribution ratios are kept fixed. When all of the distance-measurement areas are found belonging to the background, there is no main subject in the shooting target as when a landscape is going to be shot; in this case, the in-focus closeness degree DEG_Sn has little significance. When there has been a change in picture composition, the in-focus closeness degree DEG_Sn is unreliable.

Moreover, when efficient use of the detected distance DV is impossible, the in-focus closeness degree DEG_Sn is determined not on the basis of the detected distance difference ΔDVreln but on the basis of the defocus amount difference ΔDFreln, and is thus a little less reliable. However, it is to be noted that it is also possible to determine the contribution ratios WTafm on the basis of the in-focus closeness degree DEG_Sn determined on the basis of the defocus amount difference ΔDFreln; in that case, step #1006 is omitted.

When the results of all of the checks in #1004 to #1014 are false, the contribution ratio WTafn of the light-amount-control area corresponding to each distance-measurement area n is calculated on the basis of the in-focus closeness degree DEG_Sn (#1016 to #1022). Specifically, the in-focus closeness degree DEG_Sn is multiplied by a constant C7, and a constant C8 is added to the resulting value to determine the contribution ratio WTafn (#1018). An upper and a lower limit are set on the contribution ratio WTafn. Specifically, the constants C7 and C8 are set equal to 0.5625 and −0.4375, respectively, and the upper and lower limits are set at 8 and 0.125. Here, the in-focus closeness degree DEG_Sn corresponding to the upper and lower limits 8 and 0.125 is 15 and 1, respectively. The contribution ratio WTaf0 of the light-amount-control area 0 is set equal to 0 (#1024).

Next, on the basis of the four brightness values BVC0 to BVC3 determined in FIG. 14, the contribution ratio WTafm of the light-amount-control areas in which high contrast is obtained under ambient light is corrected (#1026). Specifically, if the brightness BVCm is greater than 9.5, the contribution ratio is corrected so as to be equal to one fourth of the contribution ratio WTafm set in #1002 or of the contribution ratio WTafm calculated in #1018. This helps prevent exposure control from being affected by an extremely bright object, such as a light source, placed within the shooting range.

Lastly, the contribution ratios WTafm of the individual light-amount-control areas m are normalized (#1028). Normalization is achieved by diving the contribution ratios WTafm of the individual light-amount-control areas m by the greatest value among them and then multiplying the resulting value by 8.

Figure 23:
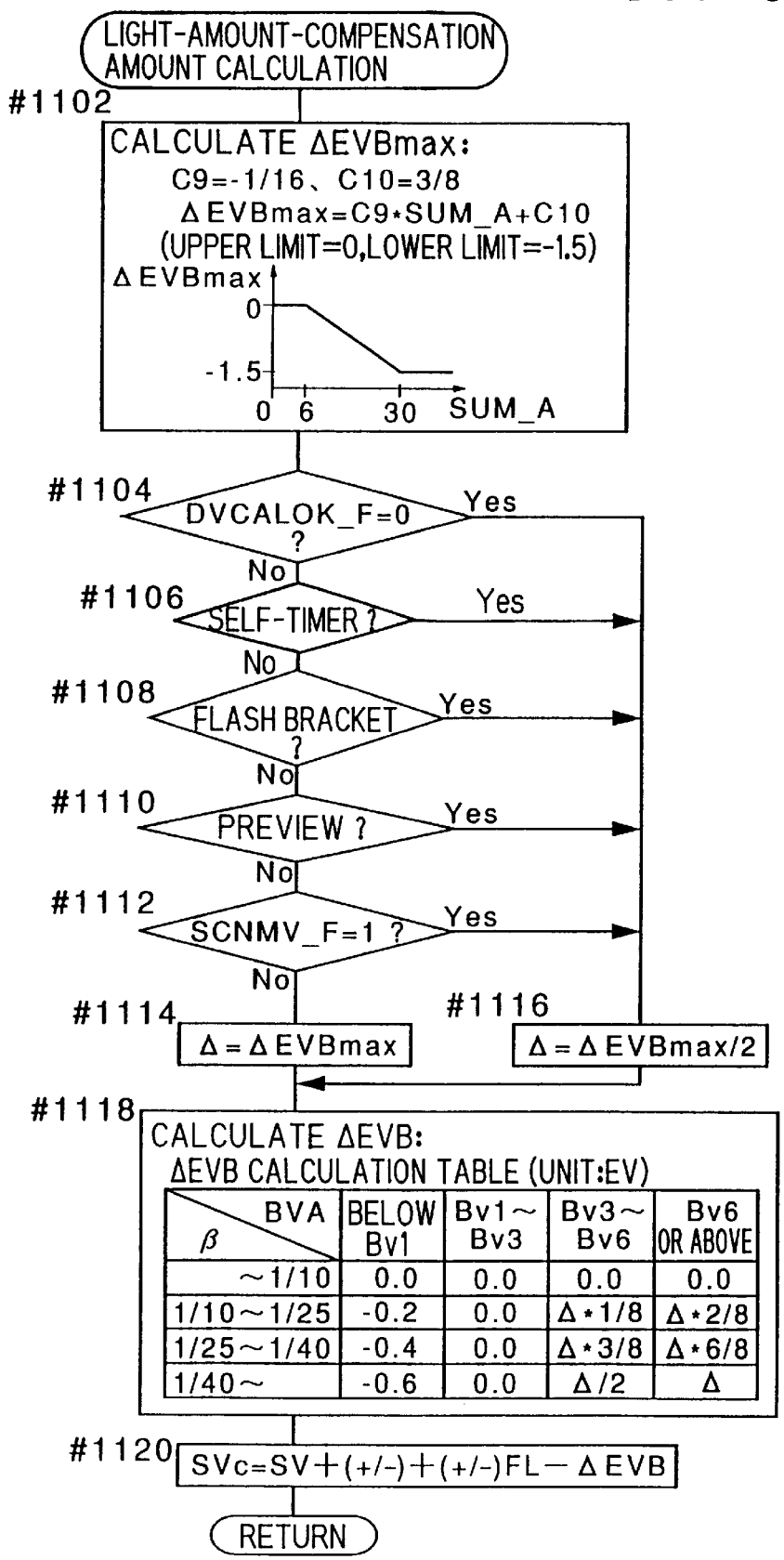
FIG. 23 is a flow chart showing the flow of operations for calculating the light-amount-compensation amount.

FIG. 23 shows the flow of operations for calculating the light-amount-compensation amount ΔEVB, performed in step #328 shown in FIG. 13. The light-amount-compensation amount ΔEVB is given as an APEX-system-complying value. First, the maximum value ΔEVBmax of the light-amount-compensation amount ΔEVB is determined (step #1102). This is achieved by multiplying the sum SUM_A of the background degree determined in step #536 shown in FIG. 16 by a constant C9 and adding a constant C10 to the resulting value. An upper and a lower limit are set on the maximum light-amount-compensation amount ΔEVBmax. Specifically, the constants C9 and C10 are set equal to −1/16 and 3/8, respectively, and the upper and lower limits are set at 0 and −1.5, respectively. Here, the sum SUM_A of the background degree corresponding to the upper and lower limits 0 and −1.5 is 6 and 30, respectively.

Next, whether the flag DVCALOK_F indicating whether distance-measurement information has been obtained in all of the distance-measurement areas or not is 0 or not, i.e. whether the focus is still to be locked or has already been locked, is checked (#1104), whether self-timer shooting is specified or not is checked (#1106), whether flash bracket shooting is specified or not is checked (#1108), whether previewing is being performed or not, i.e. whether the diaphragm 37 is stopped down or not is checked (#1110), and whether the flag SCNMV_F is 1 or not, i.e. whether or not there has been a change in picture composition after the focus was locked, is checked (#1112).

If the results of all of the checks in #1104 to #1112 are false, the value A used in the next step #1118 is set equal to the maximum light-amount-compensation amount ΔEVBmax (#1114). If the result of any of the checks in #1104 to #1112 is true, the value Δ is set equal to one half of the maximum light-amount-compensation amount ΔEVBmax (#1116). This helps prevent overcompensation in cases where the above-mentioned conditions are satisfied as when there has been a change in picture composition.

Next, on the basis of the image magnification $\beta$ and the background brightness BVA, the compensation amount $\Delta$EVB is determined (#1118). Here, the image magnification $\beta$ is classified into four ranges, namely above $1/10$, from $1/10$ to $1/25$, from $1/25$ to $1/40$, and from $1/40$ downward, and the background brightness BVA is classified into four ranges, namely below Bv1, from Bv1 to Bv3, from Bv3 to Bv6, and from Bv6 upward so that a different compensation amount $\Delta$EVB will be set in accordance with the ranges of those values.

Specifically, if the image magnification $\beta$ is in the range above $1/10$, the compensation amount $\Delta$EVB is set equal to 0 irrespective of the background brightness BVA, and, if the background brightness BVA is in the range from Bv1 to Bv3, the compensation amount $\Delta$EVB is set equal to 0 irrespective of the image magnification $\beta$. If the background brightness BVA is in the range below Bv1, the compensation amount $\Delta$EVB is varied from 0.0 to $-0.6$ in steps of 0.2 according as the image magnification $\beta$ decreases. If the background brightness BVA is in the range from Bv6 upward, the compensation amount $\Delta$EVB is set equal to $\Delta \cdot 2/8$, $\Delta 6/8$, or $\Delta$ in accordance with whether the image magnification $\beta$ is in the range from $1/10$ to $1/25$, from $1/25$ to $1/40$, or from $1/40$ downward, respectively. If the background brightness BVA is in the range from Bv3 to Bv6, the compensation amount $\Delta$EVB is set equal to one half of the compensation amount $\Delta$EVB set when the background brightness BVA is in the range from Bv6 upward.

Next, on the basis of the determined compensation amount $\Delta$EVB, the control value SVc for the sensitivity of the film F in flash shooting is determined (#1120). The sensitivity control value SVc is determined by subtracting the calculated compensation amount $\Delta$EVB from the sum of the true sensitivity SV of the film F, the exposure-compensation amount (+/−) specified by the user, and the light-amount-compensation amount (+/−)FL specified by the user.

Figure 24:
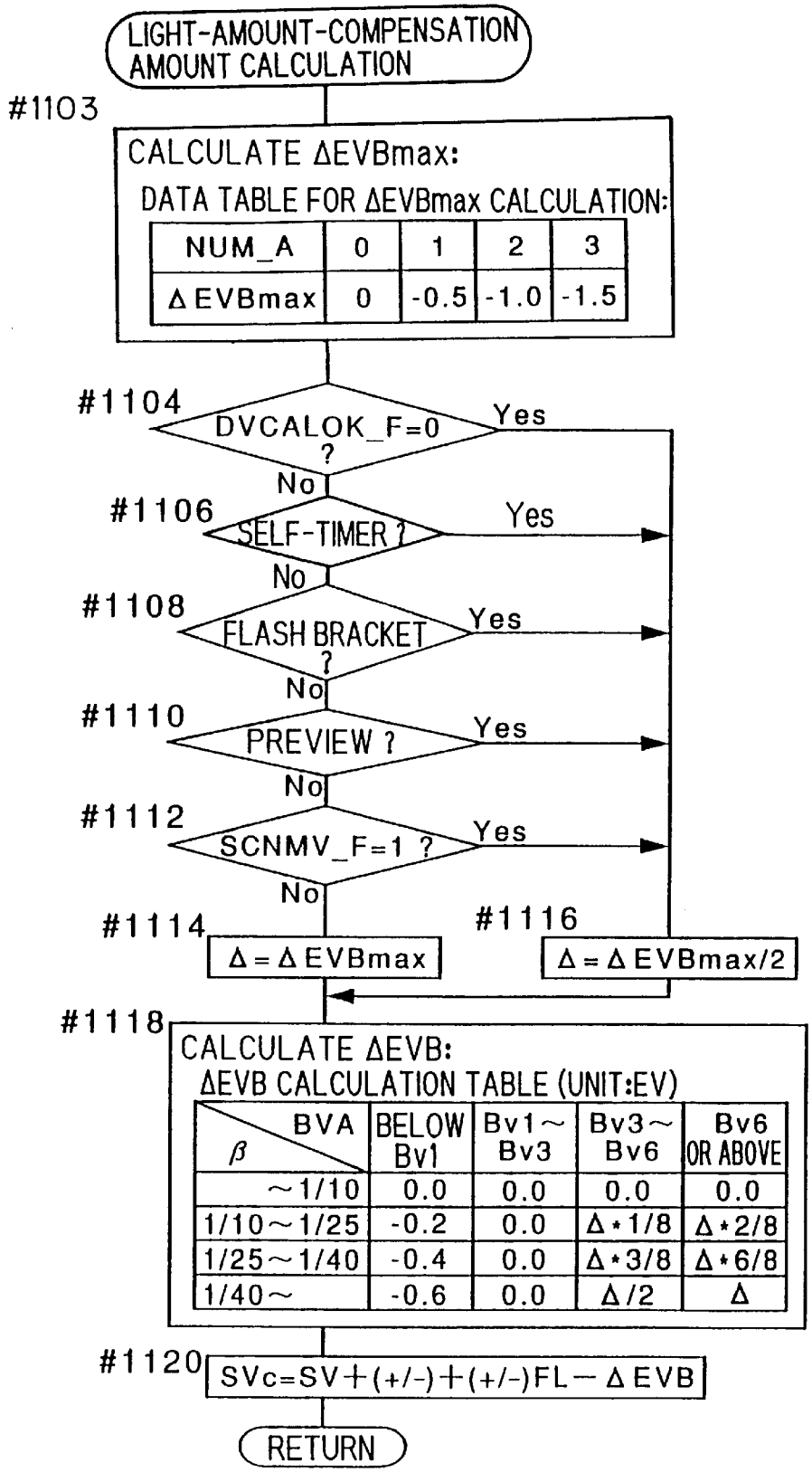
FIG. 24 is a flow chart showing another example of the flow of operations for calculating the light-amount-compensation amount.

In the above-described operations, the maximum light-amount-compensation amount $\Delta$EVBmax is calculated on the basis of the sum SUM_A of the background degree. However, it is also possible to calculate the maximum light-amount-compensation amount $\Delta$EVBmax on the basis of the number NUM_A of background areas. The flow of operations for calculating the light-amount-compensation amount $\Delta$EVB according to this method is shown in FIG. 24.

In accordance with whether the number NUM_A of background areas is 0, 1, 2, or 3, the maximum light-amount-compensation amount $\Delta$EVBmax is set equal to 0. $-0.5$, $-1.0$, or $-1.5$, respectively (step #1103). In this case, the upper and lower limits are set of their own accord. The operations performed thereafter are the same as those described above, and therefore overlapping descriptions will not be repeated.

Figure 25:
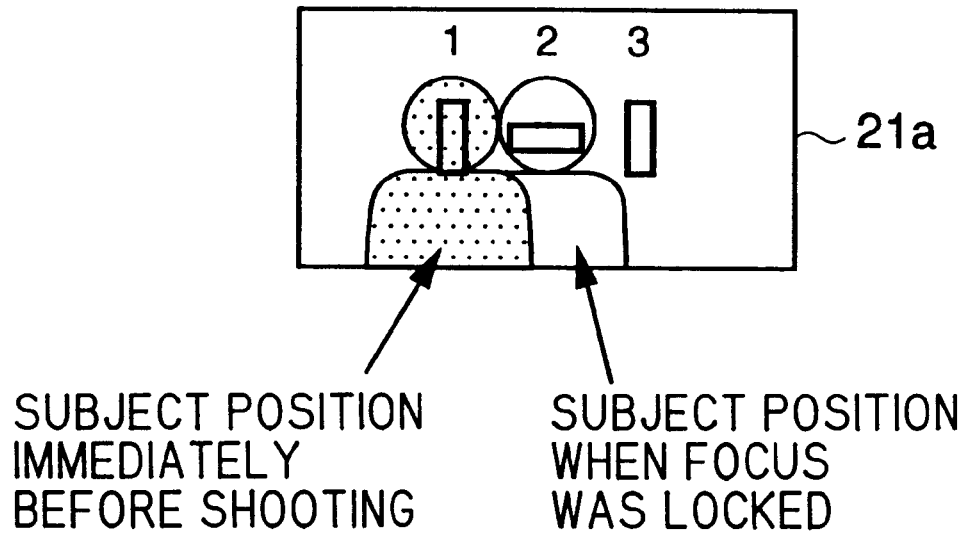
FIG. 25 is a diagram showing an example of the relationship between the subject and the distance-measurement areas as observed when a change occurs in picture composition after the focus is locked.

Now, an example of how a change in picture composition is detected in the camera 1 and how exposure control and light amount control are achieved there in accordance with a change in picture composition will be described. Suppose that, as shown in FIG. 25, the user has changed the direction of the camera in such a way that the subject, which was located in the distance-measurement area 2 of the distance-measurement module 21 when the focus was locked, is located in the distance-measurement area 1 immediately before shooting.

In this case, by comparing the detected distance DVaf2 (=DVAF) obtained in the distance-measurement area 2 when the focus was locked with the detected distance DVrel2 obtained in the in-focus area 2 immediately before shooting, a change in picture composition is detected. Moreover, by comparing the detected distance DVaf2 obtained in the distance-measurement area 2 when the focus was locked with the detected distances DVrel1 and DVrel3 obtained in the distance-measurement areas 1 and 3 immediately before shooting, the subject is recognized as located in the distance-measurement area 1 immediately before shooting. A change in picture composition and the position of the subject thereafter can be recognized also by using the defocus amounts DFaf2 and DFrel1 to DFrel3 in place of the detected distances DVaf2 and DVrel1 to DVrel3.

In this case, in exposure control, the photometry area BV6 (see FIG. 7) of the photometry module 22 corresponding to the distance-measurement area 1 and the photometry areas around it are given heavier weights Gs6 and so forth. This allows the exposure value to be set with priority given to the amount BV6 and so forth of light received in the photometry area BV6 and in the photometry areas around it, and thus makes it possible to achieve appropriate exposure when the subject is shot under ambient light.

Moreover, in light amount control, the light-amount-control area 1 of the light-amount-control module 23 corresponding to the distance-measurement area 1 is given a higher contribution ratio WTaf1 than the other light-amount-control areas. This allows the time at which emission of illumination light is stopped, i.e. the amount of light emitted, to be set with priority given to the amount of light received in the light-amount-control area 1, and thus makes it possible to achieve appropriate exposure when the subject is shot in flash shooting.

Now, how the positional relationship between the subject and the background is detected in the camera 1 and how light amount control is achieved there in accordance with the detected positional relationship will be described with reference to the example shown in FIG. 25. By comparing the detected distance DVaf2 (=DVAF) obtained in the distance-measurement area 2 when the focus was locked with the detected distances DVrel1 to DVrel3 obtained in the distance-measurement areas 1 to 3 immediately before shooting, the background degrees DEG_A1 to DEG_A3 and the in-focus closeness degrees DEG_S1 to DEG_S3 of the distance-measurement areas 1 to 3 are determined. This can be achieved also by using the defocus amounts DFaf2 and DFrel1 to DFrel3 in place of the detected distances DVaf2 and DVrel1 to DVrel3.

On the basis of the determined background degrees DEG_A1 to DEG_A3, it is recognized that the illumination light reflected from the subject is detected in the light-amount-control area 1. Moreover, it is also recognized that, if the illumination light reaches the background, the number NUM_A of light-amount-control areas in which the light reflected from the background is detected is 2 and they are the light-amount-control areas 2 and 3. Furthermore, on the basis of the in-focus closeness degrees DEG_S2 and DEG_S3, it is possible to determine the difference between the distance to the subject and the distance to the background, and thus it is possible to predict how much of the illumination light reflected from the background will be received.

At this time, the light-amount-control area 1 is given a higher contribution ratio WTaf1 than the other light-amount-control areas so that the amount of illumination light emitted will be determined with priority given to the amount of light received in the light-amount-control area 1. Moreover, the amount of light emitted is corrected in consideration of the amount of light reflected from the background. This helps alleviate the effects of the background, and thus makes it possible to achieve appropriate exposure when the subject is shot in flash shooting.

Even if there has been no change in picture composition after the focus was locked, it is possible to set the amount of emitted light appropriately in quite the same manner. Moreover, even if the focus was not locked, by using the detected distance or the defocus amount obtained immediately before shooting in the distance-measurement area which is being used for focus adjustment of the taking lens 30, in place of the detected distance DVAF or the defocus amount DFAF obtained when the focus is locked, it is possible to determine the background degrees DEG_A1 to DEG_A3 and the in-focus closeness degrees DEG_S1 to DEG_S3. Therefore, light amount control may be performed on the basis of these values.

As described heretofore, the automatic-focusing camera 1 of this embodiment is provided with a multiple-point distance-measurement means having a plurality of distance-measurement areas for outputting distance-measurement information to be used for focus adjustment, a multiple-area light-sensing means having a plurality of light-sensing areas including those corresponding individually to the distance-measurement areas, an on-focusing information output means for outputting distance-measurement information obtained when focus is achieved, an on-shooting information output means for outputting distance-measurement information obtained immediately before shooting, a picture composition change detecting means for detecting a change in picture composition by comparing the distance-measurement information output from the two output means, and an exposure control means for controlling the exposure of an image to be shot on the basis of the amount of received light detected by the multiple-area light-sensing means and the change in picture composition detected by the picture composition change detecting means.

Figure 26:
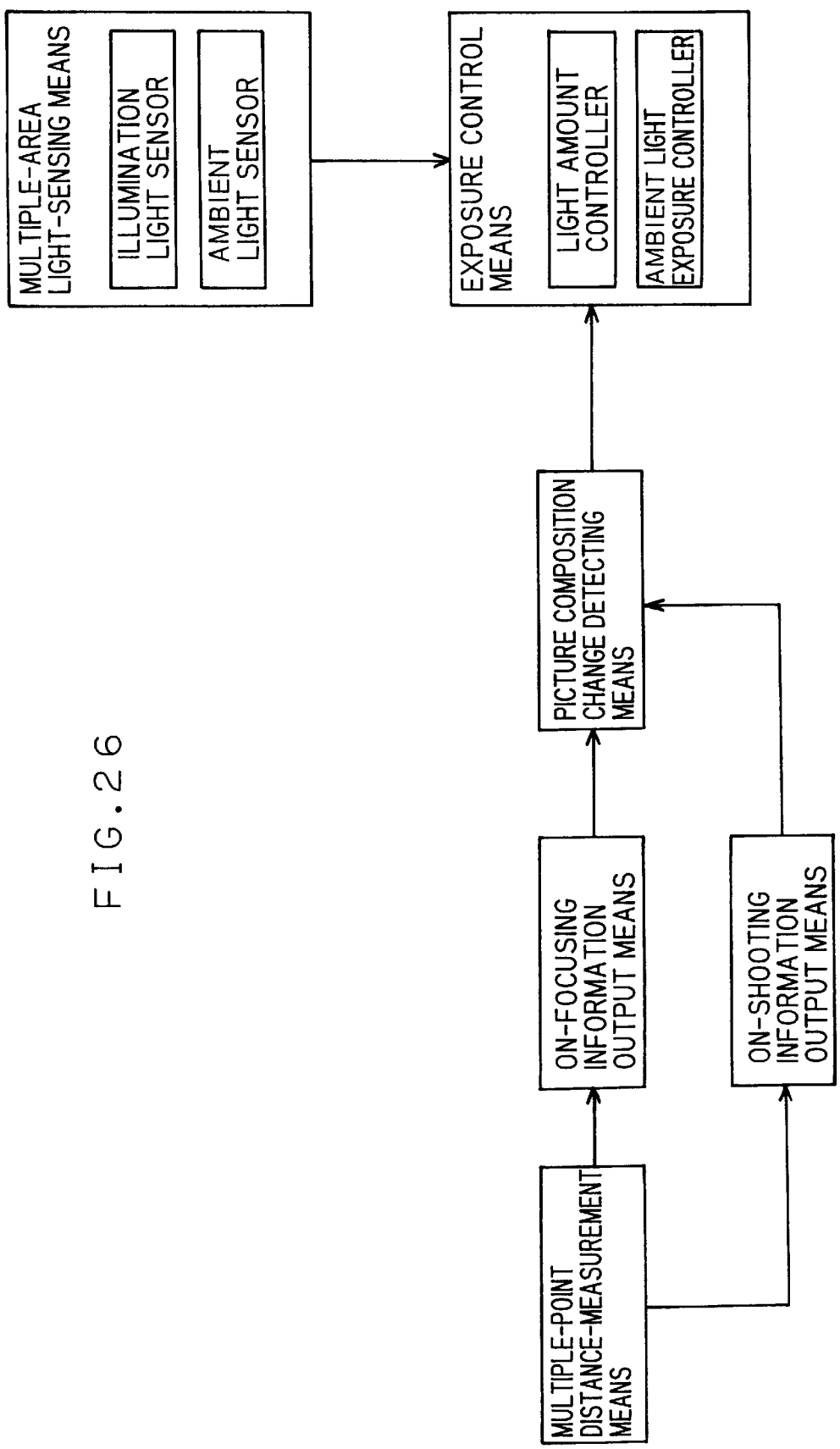
FIG. 26 is a block diagram showing the relationship, as seen from one viewpoint, among the focus-detection, exposure-control, and light-amount-control functions of the camera of the embodiment.

The configuration of the camera 1 as seen from this perspective is shown in FIG. 26. This configuration makes it possible to achieve appropriate exposure in an image to be shot even if there has been a change in picture composition after the focus was locked.

The multiple-area light-sensing means includes an illumination light sensor for detecting the amount of light received when illumination light for illuminating the subject is emitted, and the exposure control means includes a light amount controller for stopping emission of illumination light when the amount of received light detected by the illumination light sensor reaches a reference value. Moreover, the multiple-area light-sensing means also includes an ambient light sensor for detecting the amount of ambient light received, and the exposure control means also includes an ambient light exposure controller for controlling exposure on the basis of the amount of received light detected by the ambient light sensor. Thus, it is possible to achieve appropriate exposure in an image to be shot both in flash shooting and in ambient light shooting.

The camera 1 of this embodiment is provided with a multiple-point distance-measurement means having a plurality of distance-measurement areas for obtaining distance-measurement information related to the distance to the shooting target in each of the distance-measurement areas, a light-sensing means for sensing reflected illumination light and detecting the amount of light received, a subject/background state detecting means for detecting the state of distribution of the subject, which is the main object included in the shooting target, and the background on the basis of the distance-measurement information, and a light-amount-control means for determining a reference value on the basis of the state of distribution of the subject and the background and stopping emission of illumination light when the amount of received light detected by the light-sensing means reaches the reference value.

Figure 27:
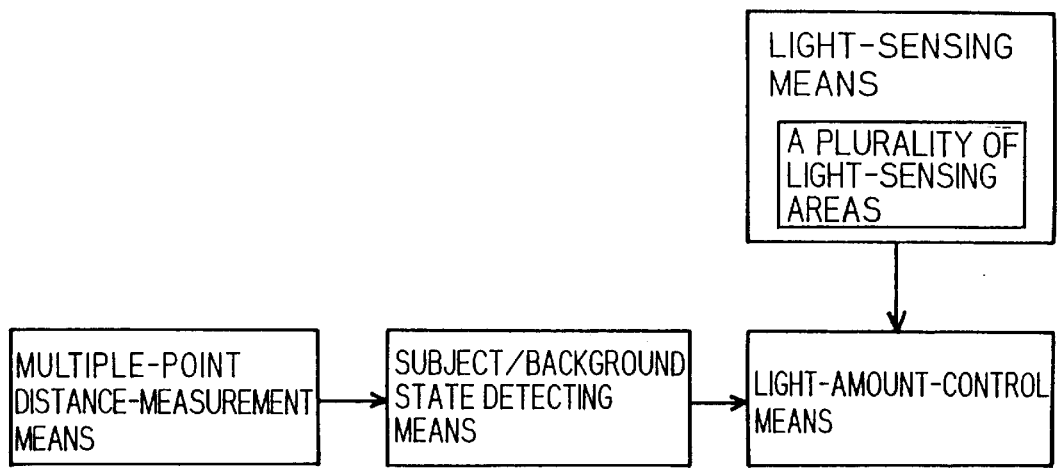
FIG. 27 is a block diagram showing the relationship, as seen from another viewpoint, between the focus-detection and light-amount-control functions of the camera of the embodiment.
Figure 28:
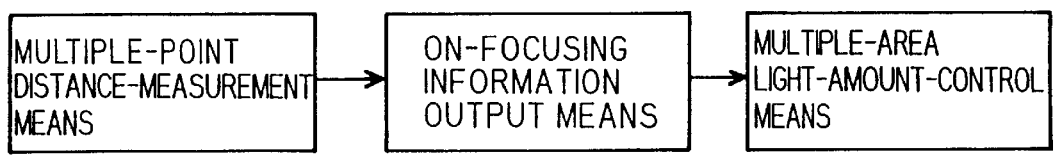
FIG. 28 is a diagram showing the configuration of the light-amount-control system of a conventional automatic-focusing camera.
Figure 29:
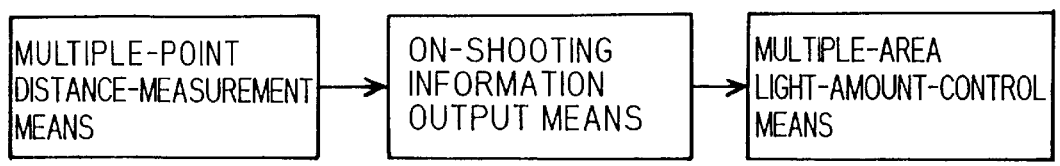
FIG. 29 is a diagram showing the configuration of the light-amount-control system of another conventional automatic-focusing camera.
Figure 30:
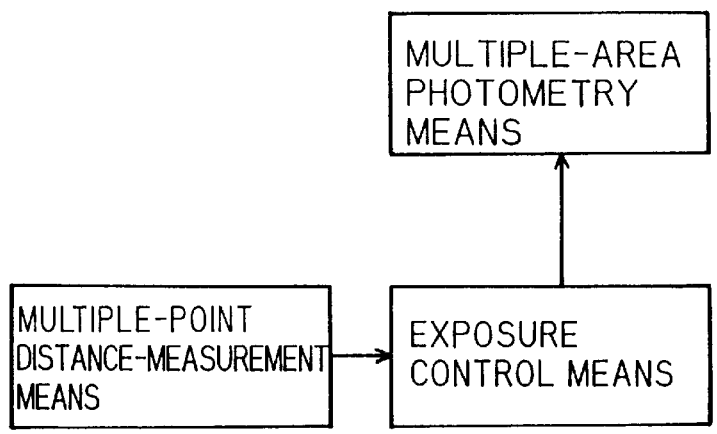
FIG. 30 is a diagram showing the configuration of the exposure -control system of another conventional automatic -focusing camera.
Figure 31:
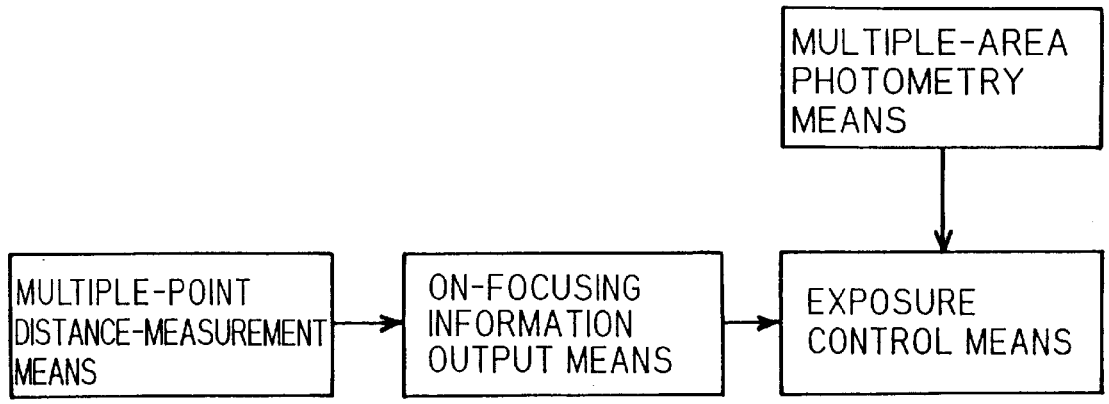
FIG. 31 is a diagram showing the configuration of the exposure-control system of another conventional automatic-focusing camera.

The configuration of the camera 1 as seen from this perspective is shown in FIG. 27. This configuration makes it possible to achieve appropriate light amount control in flash shooting on the basis of the state of distribution of the subject, which is the main object included in the shooting target, and the background.

The light-sensing means detects the amount of light received in a plurality of light-sensing areas including those corresponding individually to the distance-measurement areas. The light-amount-control means sets contribution ratios for the individual light-sensing areas on the basis of the state of distribution of the subject and the background, and stops emission of illumination light when the sum of the amounts of light received in the individual light-sensing areas multiplied by their respective contribution ratios reaches the reference value. This allows the amount of light emitted to be determined with priority given to the subject, and thus makes it possible to illuminate the subject to appropriate brightness in shooting.

It is to be understood that the weights given to the individual photometry areas, the contribution ratios of the individual light-amount-control areas, the light-amount-compensation amount, and other values given specifically in the embodiment described above are merely typical examples, and therefore they may be set differently in practical applications. In setting those values, it is to be noted that the brightness of an image to be shot depends on various factors that are interrelated with one another, and therefore it is essential to strike a proper balance among those factors to achieve appropriate exposure in the image shot.

Moreover, although the above descriptions deal with, as an example, a camera that achieves shooting by exposing silver-halide-based film, the control achieved in the above-described embodiment is applicable also to a digital camera that achieves shooting by converting light into electric signals by means of a charge-coupled device (CCD). In that case, the photoelectric conversion time of the CCD corresponds to the shutter speed, and thus the aperture value and the photoelectric conversion time are controlled to set an exposure value.

Obviously, many modifications and variations of the present invention are possible in light of the above teachings. It is therefore to be understood that within the scope of the appended claims, the invention may be practiced other than as specifically described.

What is claimed is:

1. A camera comprising:
   a taking lens;
   a distance-measurement device for obtaining information with which to perform focus adjustment and focus condition checking of the taking lens;
   a light-sensing device for detecting an amount of light coming from a subject;
   a first calculator for obtaining information related to a distance to the subject on a basis of information fed from the distance-measurement device at a moment when the taking lens is focused;
   a second calculator for obtaining information related to the distance to the subject on a basis of information fed from the distance-measurement device after the moment when the taking lens is focused;

a detector for detecting a change in picture composition on a basis of the information obtained by the first calculator and the information obtained by the second calculator; and a controller for controlling exposure on a basis of the amount of light coming from the subject as detected by the light-sensing device and the change in picture composition as detected by the detector.

2. A camera as claimed in claim 1, wherein the second calculator obtains the information on a basis of information fed from the distance-measurement device immediately before a shot is taken.

3. A camera as claimed in claim 1, wherein the distance-measurement device has a plurality of distance-measurement areas, and obtains repeatedly in each of the distance-measurement areas the information with which to perform focus adjustment and focus condition checking of the taking lens.

4. A camera as claimed in claim 3, wherein the light-sensing device has a plurality of light-sensing areas including those which correspond to the plurality of distance-measurement areas of the distance-measurement device, and detects in each of the light-sensing areas the amount of light coming from the subject.

5. A camera as claimed in claim 4, wherein the light-sensing device is a light-amount-control device for detecting an amount of illumination light reflected from the subject.

6. A camera as claimed in claim 5, wherein the controller sets a predetermined value on a basis of the change in picture composition as detected by the detector, and stops emission of the illumination light when a sum of amounts of light sensed in the individual light-sensing areas of the light-sensing device reaches the predetermined value.

7. A camera as claimed in claim 5, wherein the controller sets contribution ratios of the individual light-sensing areas of the light-sensing device on a basis of the change in picture composition as detected by the detector, and stops emission of the illumination light when a sum of amounts of light sensed in the individual light-sensing areas multiplied individually by the contribution ratios thus set reaches a predetermined value.

8. A camera as claimed in claim 5, wherein the detector detects a change in picture composition on a basis of information obtained by the first calculator for the distance-measurement area of the distance-measurement device which is used to check that the taking lens is focused on the subject and information obtained by the second calculator for the same distance-measurement area, and wherein, when the detector detects a change in picture composition, the controller sets contribution ratios of all of the light-sensing areas of the light-sensing device to be approximately equal, and stops emission of the illumination light when a sum of amounts of light sensed in the individual light-sensing areas multiplied individually by the contribution ratios thus set reaches a predetermined value.

9. A camera as claimed in claim 5, wherein the detector finds a difference between information obtained by the first calculator for the distance-measurement area of the distance-measurement device which is used to check that the taking lens is focused on the subject and information obtained by the second calculator for the individual distance-measurement areas, and wherein the controller sets contribution ratios of the individual light-sensing areas of the light-sensing device on a basis of the difference found by the detector, and stops emission of the illumination light when a sum of amounts of light sensed in the individual light-sensing areas multiplied individually by the contribution ratios thus set reaches a predetermined value.

10. A camera as claimed in claim 4, wherein the light-sensing device is a photometry device for detecting an amount of light coming from the subject under ambient light.

11. A method of controlling exposure in a camera, comprising:

a step of detecting an amount of light coming from a subject;

a step of obtaining first information related to a distance to the subject at a moment when a taking lens is focused;

a step of obtaining second information related to a distance to the subject after the moment when the taking lens is focused;

a step of detecting a change in picture composition on a basis of the first information and the second information; and a step of controlling exposure on a basis of the amount of light thus detected and the change in picture composition thus detected.

12. A camera comprising:

a distance measurement sensor for obtaining information related to a distance to a shooting target;

a light sensor for detecting an amount of illumination light reflected from the shooting target;

a detector for detecting distribution of a main subject and a background included in the shooting target on a basis of the information obtained by the distance measurement sensor; and a controller for setting a predetermined value on a basis of the distribution of the main subject and the background as detected by the detector and for stopping emission of the illumination light when the amount of light detected by the light sensor reaches the predetermined value, wherein the camera has a driver for driving a taking lens and for locking focus of the taking lens when the taking lens is focused, and wherein the detector detects the distribution of the main subject and the background on a basis of information obtained at a moment when the focus of the taking lens is locked and information obtained after the moment when the focus of the taking lens is locked.

13. A camera as claimed in claim 12, wherein the information obtained after the moment when the focus of the taking lens is locked is obtained immediately before a shot is taken.

14. A camera as claimed in claim 12, wherein the controller sets the predetermined value also on a basis of an image magnification.

15. A camera as claimed in claim 12, wherein the distance measurement sensor has a plurality of distance-measurement areas, and obtains in each of the distance-measurement areas the information related to the distance to the shooting target.

16. A camera as claimed in claim 15, wherein the light sensor has a plurality of light-sensing areas including those which correspond to the plurality of distance-measurement areas of the distance measurement sensor, and detects in each of the light-sensing areas the amount of illumination light reflected from the shooting target, and wherein the controller sets contribution ratios of the individual light-sensing areas of the light sensor on a basis of the distribution of the main subject and the background as detected by the detector, and stops emission of the illumination light when a sum of amounts of light sensed in the individual light-sensing areas multiplied individually by the contribution ratios thus set reaches the predetermined value.

17. A camera as claimed in claim 16, wherein the detector also detects a distance between the main subject and the background on a basis of the information obtained by the distance measurement sensor, and wherein the controller sets the contribution ratios of the individual light-sensing areas of the light sensor on a basis of the distribution of the main subject and the background and the distance between the main subject and the background as detected by the detector.

18. A camera as claimed in claim 16, wherein the controller sets the contribution ratios of the light-sensing areas of the light sensor that correspond to the background to be lower than the contribution ratios of the light-sensing areas that correspond to the main subject, and sets the predetermined value in accordance with a ratio of a number of light-sensing areas that correspond to the background to a number of light-sensing areas that correspond to the main subject.

19. A camera as claimed in claim 16, wherein, when none of the plurality of the distance-measurement areas of the distance measurement sensor corresponds to the main subject, the controller sets the contribution ratios of all of the light-sensing areas of the light sensor to be approximately equal to one another, and sets the predetermined value lower than when any of the distance-measurement areas corresponds to the main subject.

20. A method of controlling illumination light in a camera, comprising:

a step of obtaining information related to a distance to a shooting target;

a step of detecting distribution of a main subject and a background included in the shooting target based on the information thus obtained at a moment when focus is locked and based upon information obtained after the moment when the focus is locked;

a step of setting a predetermined value on a basis of the distribution of the main subject and the background thus detected;

a step of detecting an amount of illumination light reflected from the shooting target; and a step of stopping emission of the illumination light when the amount of light thus detected reaches the predetermined value.

* * * * *